United States Patent [19]

Kiyanagi et al.

[11] Patent Number: 5,596,605
[45] Date of Patent: Jan. 21, 1997

[54] RADIO RECEIVER FOR USE IN THE RECEPTION OF DIGITAL MULTIPLEXING SIGNALS

[75] Inventors: Hiroyuki Kiyanagi; Yuitsu Ogata, both of Sendai; Toshio Tamura, Kawasaki; Hisao Narita; Takahiko Terakado, both of Sendai; Kenzo Kobayashi, Kawasaki, all of Japan

[73] Assignee: Fujitsu Limited, Kanagawa, Japan

[21] Appl. No.: 408,143

[22] Filed: Mar. 20, 1995

[30] Foreign Application Priority Data

Mar. 18, 1994 [JP] Japan .................................... 6-048712
Dec. 26, 1994 [JP] Japan .................................... 6-322017

[51] Int. Cl.⁶ .............................. H04L 27/04; H03D 3/24
[52] U.S. Cl. ........................ 375/326; 375/232; 375/340; 375/345; 329/307
[58] Field of Search ............................ 375/261, 264, 375/266, 340, 344, 345, 326, 232, 339, 376; 329/304, 306, 307, 308; 455/234.1; 364/724.19, 724.2

[56] References Cited

U.S. PATENT DOCUMENTS

| | | | |
|---|---|---|---|
| 3,962,637 | 6/1976 | Motleu et al. | 375/355 |
| 3,978,407 | 8/1976 | Forney et al. | 375/261 |
| 4,004,226 | 1/1977 | Qureshi et al. | 375/261 |
| 4,587,498 | 5/1986 | Bonnerot et al. | 375/269 |
| 4,599,732 | 7/1986 | LeFever | 375/231 |
| 4,757,266 | 7/1988 | Yoshida et al. | 375/261 |
| 4,855,692 | 8/1989 | Kennard et al. | 375/261 |
| 4,859,956 | 8/1989 | Mizoguchi | 329/304 |
| 4,879,728 | 11/1989 | Tarallo | 375/344 |
| 4,947,409 | 8/1990 | Raith et al. | 375/344 |
| 4,987,375 | 1/1991 | Wu et al. | 375/376 |
| 5,005,186 | 4/1991 | Aono et al. | 375/261 |
| 5,305,351 | 4/1994 | Mizoguchi | 375/345 |
| 5,347,569 | 9/1994 | Yamamoto | 375/261 |
| 5,400,366 | 3/1995 | Iwamatsu | 375/344 |
| 5,444,712 | 8/1995 | Betts et al. | 375/261 |

FOREIGN PATENT DOCUMENTS

| | | |
|---|---|---|
| 0212582 | 3/1987 | European Pat. Off. |
| 0213309 | 3/1987 | European Pat. Off. |
| 0262644 | 4/1988 | European Pat. Off. |
| 0314196 | 5/1989 | European Pat. Off. |
| 0486474 | 5/1992 | European Pat. Off. |
| 0524559 | 1/1993 | European Pat. Off. |

*Primary Examiner*—Tesfalde Bocure

[57] ABSTRACT

In the case where a received multi-level orthogonal amplitude signal is not synchronized with a local carrier frequency signal, a digital multiplexing radio receiver recognizes that an adaptively-equalized data exist in a specified area on the phase plane of Ich and Qch orthogonal coordinates. The receiver controls an operation of amplifying Ich and Qch demodulated signals to a fixed level, based on the data of which exist in the specified area. Similarly, the receiver controls a phase of the local carrier frequency signal based on the data of existing in the specified area, and controls tap coefficients of an adaptive transversal filter which equalizes the received multi-level orthogonal amplitude signal. In the specified area, a distance between signal points of multi-level orthogonal amplitude signal is large so that influence caused by a phase rotation is small. Accordingly, the digital multiplexing radio receiver can rapidly and stably return to a synchronous mode.

12 Claims, 31 Drawing Sheets

ENLARGED VIEW

RADIO RECEIVER FOR USE IN THE RECEPTION OF DIGITAL MULTIPLEXING SIGNALS

FIELD OF THE INVENTION

The present invention relates to a digital multiplexing radio receiver, which can receive digital multiplexing signals and, adaptively equalize and compensate an interference signal in the digital multiplexing signals, received according to a characteristic of a transmitting path.

DESCRIPTION OF THE RELATED ART

In recent years, data transmission speed tends to become faster and faster. Therefore, data are multiplexed and transmitted by such as a multi-level QAM (quadrature Amplitude Modulation).

More particularly, in such a radio communication system as above-described, a characteristic of a transmission path varies as time goes by. Therefore, the radio receiver should be controlled to adaptively perform the equalization and compensation according to the variation.

Further, there is a demand for rapid pulling in phase and stability of synchronization in the radio receiver, when the radio communication path is disconnected in a moment. Then, the radio receiver is required to be able to rapidly establishment of synchronization with a control gain of the level as the same as that in the case where the receiver is synchronized with a carrier of a transmitter site, when the receiver is not synchronized with the carrier.

Referring now to FIG. 29, a structural block diagram of a conventional radio receiver for digital multiplexing signals is shown. In FIG. 29, a demodulator 1 comprises a QAM demodulator 2 and a local oscillator 3 having a function of a voltage controlled oscillator.

Reference numeral 4 is an amplifier, 5 is an offset controller, 6 is an A/D converter, 7 is an adaptive transversal filter, 8 is a gain control voltage generator, 9 is a phase control voltage generator, 10 and 11 are M bit generators, and 12 is an offset control voltage generator.

The QAM demodulator 2 in the demodulator 1 converts a received multi-level QAM intermediate frequency signal IF to orthogonal demodulated base band signals I' and Q' for I and Q channels, according to a carrier frequency signal S1 outputted from the local oscillator 3.

The QAM demodulator 2 concurrently outputs both of the signals I' and Q'. However, the signals I' and Q' are independently processed on the circuits after the QAM demodulator 2.

The amplifier 4 amplifies the Ich and Qch demodulated base band signals I' and Q' so as to have constant output amplitudes according to according to gain control signals $S4_I$ and $S4_Q$ outputted from the gain control voltage generator 8. The amplified signals are outputted as $S2_I$ and $S2_Q$ from amplifier 4.

The offset controller 5 compensates offset components of a direct current in the amplified signals $S2_I$ and $S2_Q$ according to offset control signals $S5_I$ and $S5_Q$ outputted from the offset control voltage generator 12. $S3_I$ and $S3_Q$ denote the compensated signals in the offset controller 5.

If the analog signals $S3_I$ and $S3_Q$ that are inputted to the A/D converter 6 of the next stage include direct current components, there is a case where the analog signals $S3_I$ and $S3_Q$ are shifted from a central level. In this case, the signals $S3_I$ and $S3_Q$ can not be exactly converted to digital signals in the A/D convertor 6. Therefore, the offset control signals $S5_I$ and $S5_Q$ control the analog signals $S3_I$ and $S3_Q$ to be in the central level.

$X_I$ and $X_Q$ are used as Ich and Qch demodulated digital signals obtained by converting the analog signals $S3_I$ and $S3_Q$ in the A/D converter 6. The adaptive transversal filter 7 adaptively equalizes the data $X_I$ and $X_Q$ by removing distortion components generated in a radio link section or the previous circuits, and included in the data $X_I$ and $X_Q$. $Y_I$ and $Y_Q$ signify the data adaptively-equalized and outputted from the adaptive-equalized transversal filter 7.

The phase control voltage generator 9 generates a phase control signal P by detecting a phase difference between the adaptively-equalized data $Y_I$ and $Y_Q$ outputted from the filter 7. The local oscillator 3 varies the frequency of the carrier frequency signal S1 according to the phase control signal P so as that the phase of the outputted carrier frequency signal S1 be same as that of the input signal IF.

The M bit generators 10 and 11 output M bit signals $M_I$ and $M_Q$ that are instruction signals to instruct the gain control voltage generator 8 to output the gain control signals $S4_I$ and $S4_Q$, according to the control signal CS and the adaptively-equalized data $Y_I$ and $Y_Q$. The operation of the M bit generators 10 and 11 when these M bit signals $M_I$ and $M_Q$ are outputted will be explained in accompanying with FIG. 30. Further, the control signal CS is outputted as a synchronous control signal, in the case where it is detected that a radio receiver is not synchronized with a carrier of the sending side, by a synchronization judging circuit, not shown in the diagram.

FIG. 30 is a diagram showing an amplitude control area on phase plane of the Ich and Qch orthogonal coordinate axes of the multi-level QAM intermediate frequency signal IF corresponding to the conventional structure shown in FIG. 29. In this example, the signal IF is 64 QAM as shown in FIG. 30 (Hereinafter referred as to a 64QAM signal). Accordingly, the signal points are composed of 64 points arranged in a square of 8×8 points, in which an origin crossed with Ich axes and Qch axes is used as a center, as shown with+marks in FIG. 30, when the receipt signal IF is synchronized.

In this embodiment, the square 15 is called as a square area, and the part 16 showing crossed oblique lines including signal points on the both sides along the Ich and Qch axes in the square area 15 is called as a cruciform area, and the outside 17 of the square area 15 is called as an outside area.

When the 64QAM signal is synchronized, each signal point on the phase plane is static, and exists on the+ constellation. However, when the signal IF is not synchronized because of inter-symbol interference generation brought by, for example, the influence of fading, each signal point rotates around the origin.

Further, the amplitude of the signal IF tends to become larger as each signal point separates from the origin, in order of the cruciform area 16, the square area 15, and the outside area 17.

Furthermore, when the signal IF is synchronized, the gain of the amplifier 4 is controlled referring to the signal point of the square area 15, whereas the gain is controlled referring to the signal points of the cruciform area 16 and the outside area 17.

The control signal CS shows that the receiver is not synchronized with the transmitted carrier when the signal IF is received. An out-phase detection signal is outputted and is employed as a control signal CS, when the out of phase is detected.

A detection means, not shown in the diagram, detects whether or not the signal IF is synchronized. When a predetermined number of responses of the received signal IF with a frame synchronization pattern are continuously detected for a fixed interval, the signal IF is determined as in a synchronous mode, whereas the signal IF is determined in an asynchronous mode, and the out-phase detection signal is outputted.

Returning back to FIG. 29, the M bit generator 10 judges whether or not the signal IF is synchronized according to the control signal CS, i.e., the out-phase detection signal.

If the signal IF is synchronized, the generator 10 extracts the M bit signal $M_I$ for specifying entire areas on the phase plane from the adaptively-equalized data $Y_I$ and outputs the signal to the gain control voltage generator 8, whereas, the generator 10 outputs the M bit signal $M_I$ for specifying an area along the Ich axis of the cruciform area 16 and the outside area 17.

Similarly, the M bit generator 11 also judges whether or not the signal IF is synchronized, according to the control signal CS. If the signal IF is synchronized, the generator 11 extracts the M bit signal $M_Q$ for specifying the square area 15 from the adaptively-equalized data $Y_Q$ and outputs it to the generator 8, whereas the generator 11 outputs the M bit signal $M_Q$ for specifying the area along the Qch axes of the cruciform area 16 and the outside area 17.

The gain control voltage generator 8 judges whether or not the levels of the adaptively-equalized data $Y_I$ and $Y_Q$ corresponding to the signal points of the area specified with the M bit signals $M_I$ and $M_Q$ are larger than a reference level of the signal point. If the levels of the adaptively-equalized data $Y_I$ and $Y_Q$ are larger than the reference level, the gain control signals $S4_I$ and $S4_Q$ for controlling so as to make the level larger are outputted. If it is smaller, the gain control signals $S4_I$ and $S4_Q$ for controlling so as to make the level smaller are outputted.

However, a plurality of the signal points exist, and the levels of the adaptively-equalized data $Y_I$ and $Y_Q$ are integrated for a fixed interval according to the judgment whether or not the levels of the data $Y_I$ and $Y_Q$ are larger than the reference level. Then, the gain control signals $S4_I$ and $S4_Q$ are outputted according to the integrated value.

The offset control voltage generator 12 judges whether or not the levels of the adaptively-equalized data $Y_I$ and $Y_Q$ are larger than the reference level of the signal point on all phase plane areas, and outputs the offset control signals $S5_I$ and $S5_Q$, according to the result of the judgment.

If the level of the adaptively-equalized data $Y_I$ and $Y_Q$ is larger than the reference level, "H" is outputted. If it is smaller than the reference level, "L" is outputted. If the number of "H" is equal to that of "L", the generator 12 judges that the analog signals $S3_I$ and $S3_Q$ outputted from the offset controller 5 to be in the central level when the A/D conversion is performed. Then the generator 12 outputs the offset control signals $S5_I$ and $S5_Q$ corresponding to the result of the judgment.

If the number of "H" is larger than that of "L", the generator 12 judges that the analog signals $S3_I$ and $S3_Q$ move upward than the central level. Therefore, the generator 12 outputs the offset signals $S5_I$ and $S5_Q$ for moving the levels of the analog signals $S3_I$ and $S3_Q$ downward. If the number of "L" is larger than that of "H", the generator 12 judges that the analog signals $S3_I$ and $S3_Q$ move downward than the central level. Therefore, the generator 12 outputs the offset control signals $S5_I$ and $S5_Q$ for moving the levels of the analog signals $S3_I$ and $S3_Q$ upward.

In the above-described digital multiplexing radio receiver, when the transmission path characteristic substantially varies because of influence of fading, by which the received multi-value QAM intermediate frequency signal IF becomes in an asynchronous mode, it is required that the signal rapidly and stably returns to the synchronous mode.

However, there is a problem not to rapidly and stably return the signal IF to the synchronous mode due to the following reasons;

If the level of a signal point in the square area 15 shown in FIG. 30 is larger than a reference level on the synchronous mode, the amplifier 4 controls the signal amplitude to be lower, whereas the amplifier 4 controls it to be higher. Meanwhile, on the asynchronous mode, if the levels of the signal points in the cruciform area 16 and the outside area 17 shown in FIG. 30 are larger than the reference level, the amplitude is controlled to be lower, whereas the amplitude is controlled to be higher.

However, the phase plane is rotated on the asynchronous mode, and such a phenomenon, that the level of the signal point which should be larger than the reference level becomes lower than the reference level, appears in many signal points.

Therefore, in the case where signals corresponding to the judgment whether or not the signal points in the fixed area 15 are larger than the reference level are integrated for a fixed interval to obtain the gain control signals $S4_I$ and $S4_Q$, the integrated voltage values of the gain control signals $S4_I$ and $S4_Q$ become lower. Therefore, the amplitudes of the integrated voltage values cannot reach to the control gains equal to those on the synchronous mode.

The offset control is executed in the way that the number of the signal points which are larger than the reference level are compared with that of the signal points which are smaller than the reference level on entire phase plane regardless of the mode. If the number of the signal points which are larger than the reference level is larger than that of the signal points which are smaller than the reference level, the offset controller 5 moves the levels of analog signals $S3_I$ and $S3_Q$ downward, whereas the offset controller 5 controls to move the levels upward. However, the phase plane rotates on the asynchronous mode, and the above-described phenomenon appears. Therefore, the number of the signal points which are larger than the reference level and the number of the signal points which are smaller than the reference level can not be exactly detected, thus the exact offset control can not be executed. Furthermore, the phase plane is rotated on the asynchronous mode, and therefore, the adaptive transversal filter 3 obtains an error signal at each signal point of the cruciform area 16, and cannot perform suitable adaptive-equalization, because exactitude of the error signal at the signal points generated inside becomes lower.

Meanwhile, there has been also a strong demand of that a digital multiplexing devices have channel spacing (CH interval) of multiplexed signals of a narrow-band such as 30 MHz. Further, research of coding modulation has been continued to fulfill demands of high quality and high performance. Data multiplexed transmission using a 128 QAM (128 value Quadrature Amplitude Modulation) has been proposed as a system for realizing high quality and high performance. However, constellation of signal points in 128 QAM is different from the conventional 16 QAM, 64QAM and the like at all. Therefore, a new technological development has become an urgent demand.

More particularly, it is possible to transmit signals even at a low C/N (Carrier to Noise ratio) due to high quality of radio channels. Therefore, recovery of carrier signals is required even at a low C/N in digital multiplexing radio receiver. To fulfill such a requirement, carrier regeneration with rapidity is desired during a synchronous step.

FIG. 31 is a structural diagram of a conventional multiplexing radio receiver for 128 QAM. In FIG. 31, reference numeral "1" is a 128 QAM demodulator, "7" is an adaptive transversal filter, "20" is a distinguishing section, "80" is an error detector, and "90" is a control signal generator. An interference compensating section 70 that compensates interference from a different polarization.

As shown in FIG. 31, the adaptive transversal filter 7 outputs a signal Y, from which distortion is removed and sends it to the distinguishing section 20 and the error detecting section 80. The difference between the output Y of the adaptive transversal filter 7 and the output D of the distinguishing section 20 is outputted as an error signal e from the error detector 80.

Further, this error signal e is fed back to the adaptive transversal filter 7. Then, tap gains of the adaptive transversal filter 7 are adjusted so as that the error signal e becomes 0. Meanwhile, the error signal e is further sent to the control signal generator 90. The control signal generator 90 outputs the control signal CS which controls a carrier phase of the 128 QAM demodulator 1 according to the error signal.

In FIG. 31, the interference compensating circuit 70 removes interference given by a different polarization signal.

In such as a conventional multiplexing radio receiver for 128 QAM, the error signal e is fed back to the adaptive transversal filter 7 to adjust tap gains of the filter 7 so that the error signal e becomes 0. Accordingly, the filter 7 always performs the same control to the error signal e, regardless of a synchronous or asynchronous mode of the receiver. More particularly, the control gain becomes lower, when the received carrier is on the asynchronous mode. Therefore, a characteristic of recovery from the asynchronous mode to the synchronous mode was unsatisfactory in the conventional receiver. Further, recovery of the control signal CS for controlling carrier phase of 128QAM demodulator 1 had an unsatisfactory characteristic, too.

SUMMARY OF THE INVENTION

An object of the present invention is to provide a digital multiplexing radio receiver which can rapidly and stably recover its mode to synchronous mode, in the case where a multi-level digital received signal is not synchronized with a carrier frequency signal for demodulating to cope with various kinds of drawbacks in the above-described conventional digital multiplexing radio receiver.

It is an object of the present invention to provide a digital multiplexing radio receiver which can extend a range of pulling into a synchronous mode, by differing a phase control of a local carrier frequency signal for demodulating, according to a synchronous or asynchronous mode of a received multi-level orthogonal amplitude signal with a local carrier frequency signal.

It is a further object of the present invention to provide a digital multiplexing radio receiver which can extend a range for pulling into a synchronous mode, by differing a gain control of a demodulated multi-level orthogonal amplitude signal, according to a synchronous or asynchronous mode of a received multi-level orthogonal amplitude signal with a local carrier frequency signal.

It is a still further object of the present invention to provide a digital multiplexing radio receiver which can extend a range for pulling into a synchronous mode, by differing a control of updating coefficients of an adaptive transversal filter, according to a synchronous or asynchronous mode of a received multi-level orthogonal amplitude signal with a local carrier frequency signal.

It is more object of the present invention to provide a digital multiplexing radio receiver which can control a phase of a carrier frequency signal for demodulating based on Ich and Qch adaptively-equalized data of multi-level orthogonal amplitude signal, which exists in a specified control area on a phase plane of Ich and Qch orthogonal coordinates, in the case where a received multi-level orthogonal amplitude signal is not synchronized with a carrier frequency signal.

It is a further object of the present invention to provide a digital multiplexing radio receiver which can control a gain of a carrier frequency signal for demodulating based on Ich and Qch adaptively-equalized data of a multi-level orthogonal amplitude signal which exists in a specified control area on a phase plane of Ich and Qch orthogonal coordinates, in the case where a received multi-level orthogonal amplitude signal is not synchronized with a carrier frequency signal.

It is a still further object of the present invention to provide a digital multiplexing radio receiver which can control updating tap coefficients of an adaptive transversal filter based on Ich and Qch adaptively-equalized data of multi-level orthogonal amplitude signal which exists in a specified control area on a phase plane of Ich and Qch orthogonal coordinates, in the case where a received multi-level orthogonal amplitude signal is not synchronized with a carrier frequency signal for decoding.

Further, other objects of the present invention will become clear by the following detailed description of preferred embodiments and the attached claims.

BRIEF DESCRIPTION OF THE DRAWINGS

FIG. 15 is an explanatory diagram of constellation of QAM signal points.

DESCRIPTION OF THE PREFERRED EMBODIMENT

Figure 1:
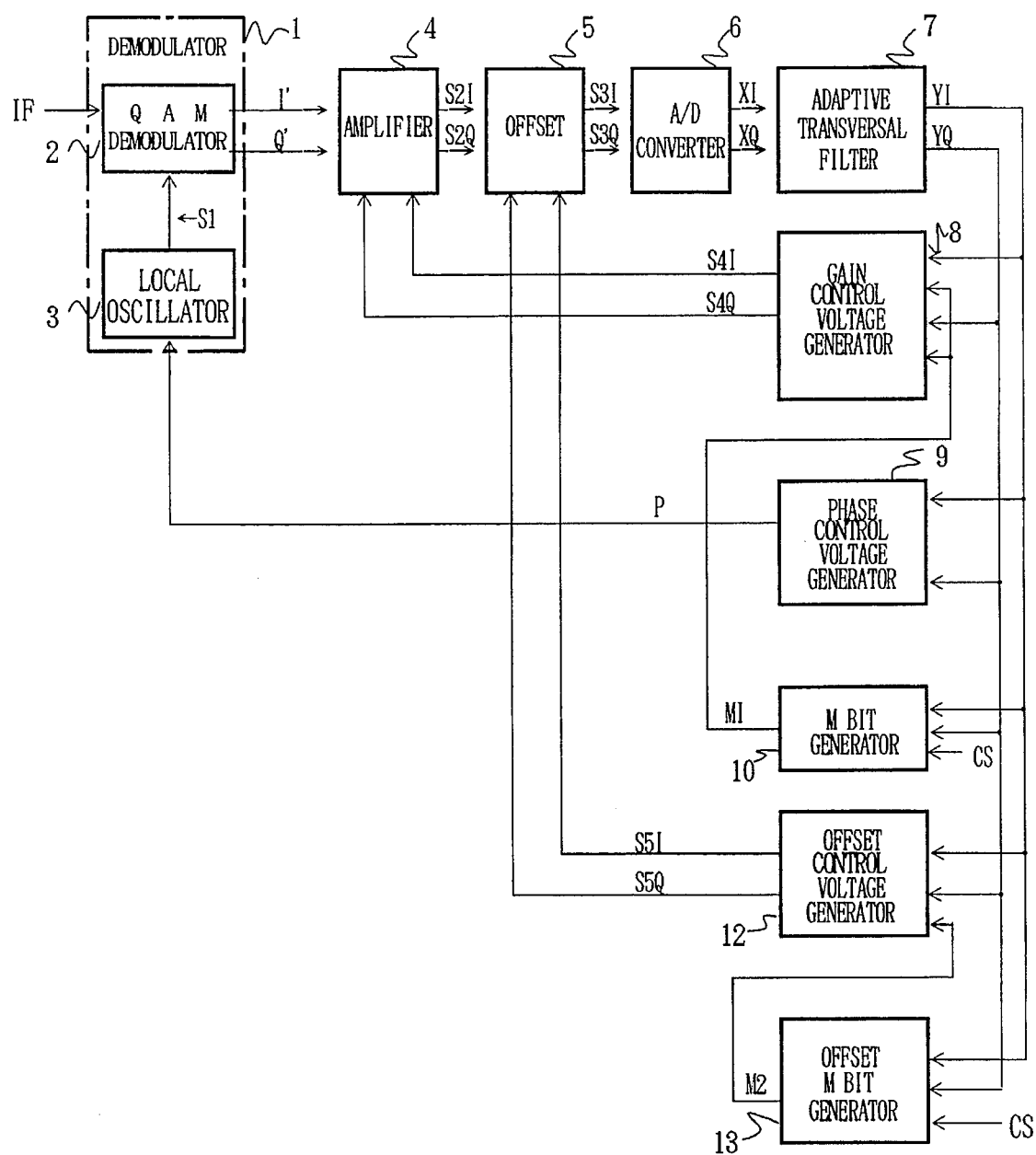
FIG. 1 is a structural block diagram of one embodiment of a digital multiplexing radio receiver according to the present invention.

Embodiments of the present invention will be explained in accordance with the attached drawings. Throughout the following descriptions, the same reference numerals in the drawings are used to denote and identify corresponding or identical components.

Figure 29:
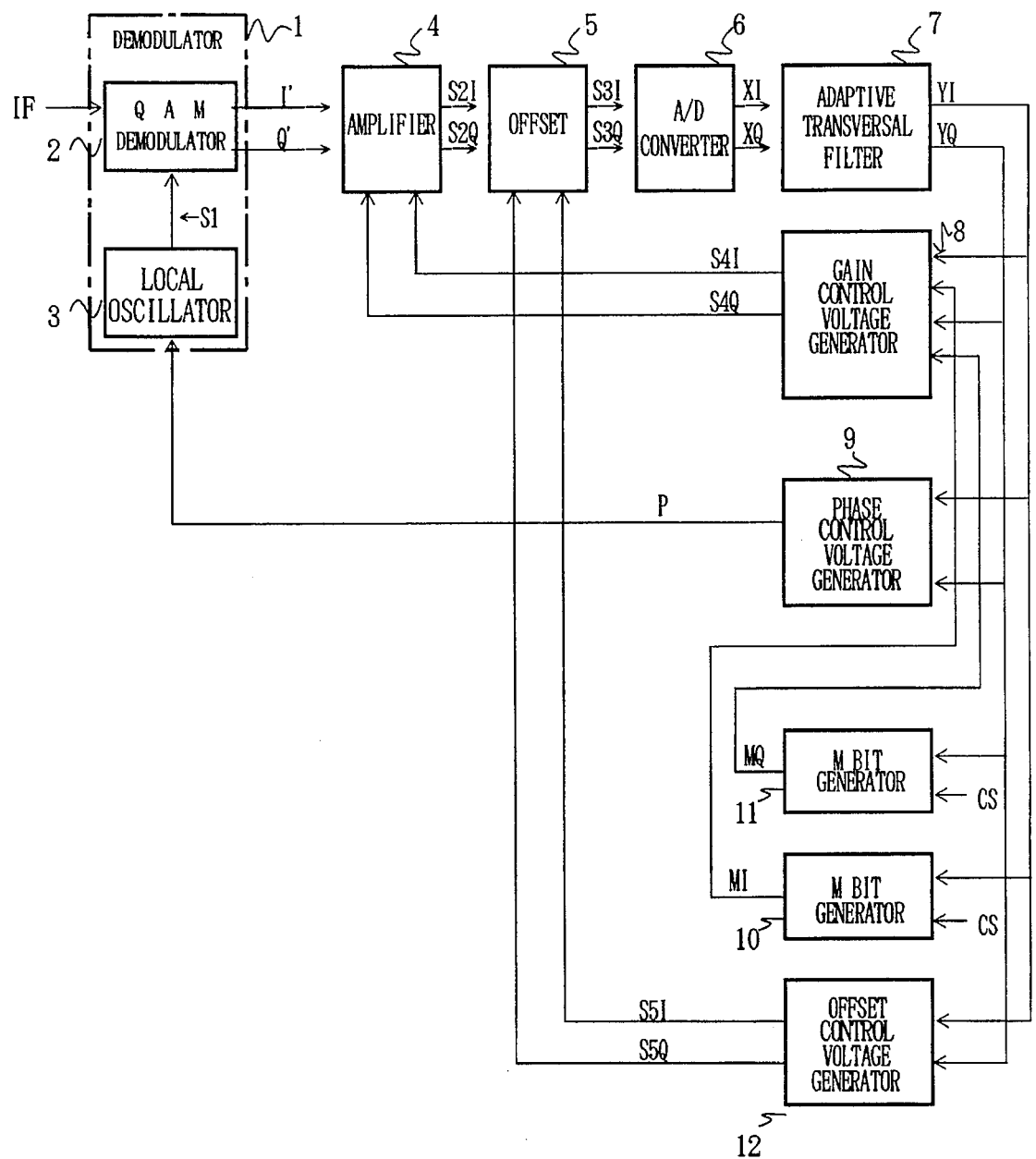
FIG. 29 is a structural block diagram of the conventional digital multiplexing radio receiver

FIG. 1 is a structural block diagram of an example of a digital multiplexing radio receiver, which is used for receiving digital multiplexing signals according to the present invention. In FIG. 1, the same numerals are used to denote parts corresponding to the same portions of the prior art shown in FIG. 29, and the explanation of the parts will be abbreviated.

In FIG. 1, a demodulator 1 comprises a QAM demodulator 2 and a local oscillator 3 having a function of a voltage-controlled oscillator. The QAM demodulator 2 demodulates a received multi-level orthogonal amplitude signal IF with a carrier frequency signal S1 outputted from the local oscillator 3 and outputs Ich and Qch demodulated signals I' and Q' which are orthogonally intersected.

An amplifier 4 which is operatively connected to the QAM demodulator 2 amplifies the Ich and Qch demodulated signals I' and Q' and outputs the Ich and Qch amplified signals $S2_I$ and $S2_Q$.

Reference numeral "5" is an offset controller, "6" is an A/D converter, "7" is an adaptive transversal filter, "8" is a gain control voltage generator, "9" is a phase control voltage generator, "10" is an M bit generator, "12" is an offset control voltage generator, and "13" is an offset M bit generator.

The adaptive transversal filter 7, the gain control voltage generator 8, the M bit generator 10, the offset control voltage generator 12 and the offset M bit generator 13 are specific portions according to the present invention in the circuit.

The adaptive transversal filter 7 adaptively equalizes the data $X_I$ and $X_Q$ outputted from the A/D converter 6 and outputs the adaptively-equalized data $X_I$ and $X_Q$. The adaptive transversal filter 7 will be explained in detail later.

The M bit generator 10 outputs the M bit signal M1 for instructing the gain control voltage generator 8 to output the gain control signals $S4_I$ and $S4_Q$. When the control signal CS as explained in FIG. 29 indicates a synchronous mode, the M bit generator 10 outputs the M bit signal M1 having "H" level. When the control signal CS indicates an asynchronous mode, the generator 10 outputs the M bit signal M1 having "H" level or "L" level, which is resulted from the judgment, explained later, of the area on the phase plane shown in FIG. 2.

Figure 2:
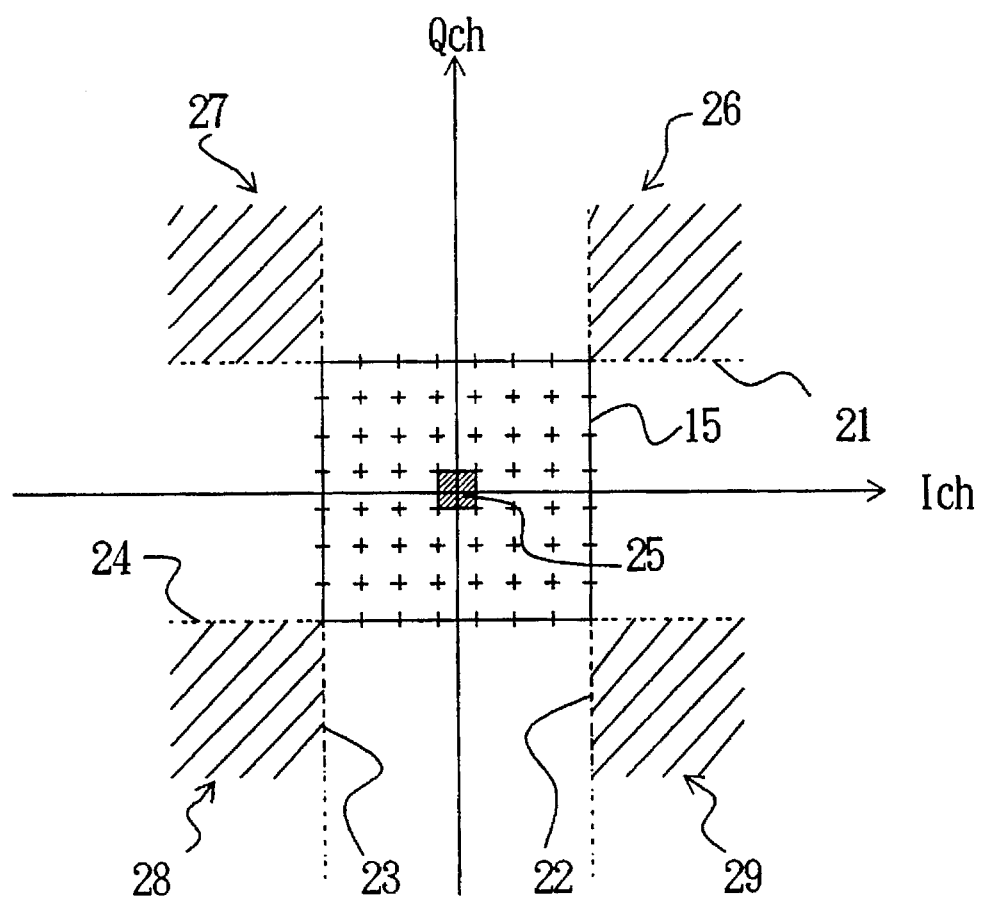
FIG. 2 is a diagram showing amplitude control area of the embodiment shown in FIG. 1.

FIG. 2 is a diagram showing the amplitude controlled area on phase plane of the Ich and Qch orthogonal axes of the 64 QAM intermediate frequency input signal IF as an embodiment. In FIG. 2, the same reference numerals are used to denote and identify corresponding or identical components shown in FIG. 30.

Figure 30:
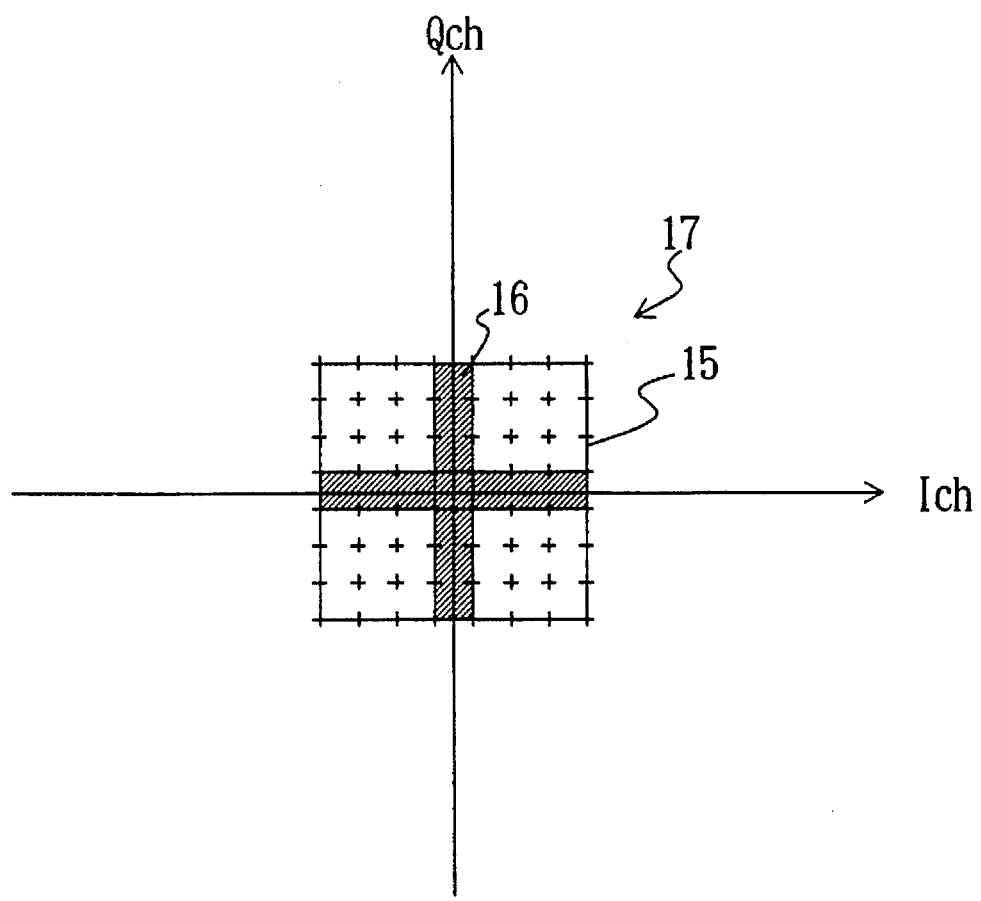
FIG. 30 is a diagram showing an amplitude controlled area of the prior art.
Figure 31:
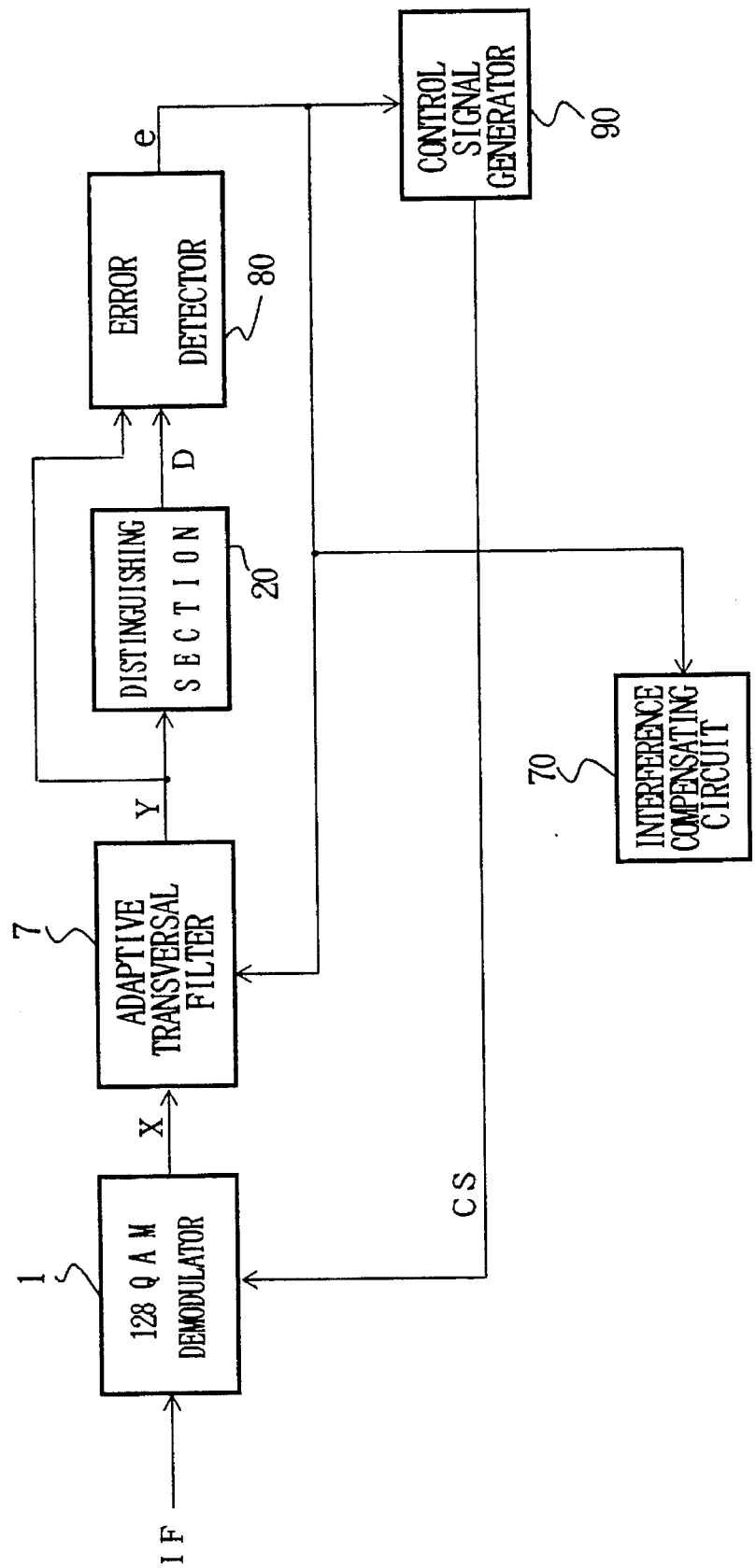
FIG. 31 is a block diagram of the conventional 128 QAM multiplexing radio receiver.

In FIG. 2, reference numeral 15 means a square area as explained regarding to FIG. 30. Numeral 26 is a first outside area, 27 is a second outside area, 28 is a third outside area, and 29 is a fourth outside area that mean areas where a signal amplitude is over a specified maximum value for explanation of the present invention. A central area 25 is resulted from connecting each signal point of each quadrant, which is most close to the origin in the square area 15.

The first outside area 26 is an area outside of the square 15 between an extension line 21 of upside and an extension line 22 of right side of the square area 15, which are crossed each other. The second outside area 27 is an area outside of a square 15 between an extension line 23 of left side and the extension line 21 of upside of the square area 15, which are crossed each other. The third outside area 28 is an area outside of the square 15 between an extension line 24 of downside and the extension line 23 of left side of the square area 15, which are crossed each other. The fourth outside area 29 is an area outside of square 15 between the extension line 24 of downside and the extension line 22 of the light side of the square area 15, which are crossed each other.

When the input signal IF is synchronized, the phase plane is static, and each signal point exists on+constellation. However, when inter-symbol interference generates because of influence of fading, so that the input signal IF is not synchronized, each signal point rotates around the origin. Even if the signal points are rotated, only one signal point enters to the first outside area 26 to the fourth outside area 29, respectively.

Accordingly, the signal point in each of outside areas 26 to 29 can be detected even when the signal IF is not synchronized, as same as the case where the signal IF is synchronized. Four signal points can be also detected in the central area 25 even when the signal IF is not synchronized, as same as the case where the signal IF is synchronized.

The M bit generator 10 judges whether or not these signal points exist in the central area 25 and the first to fourth outside areas 26 to 29. When the signal points exist, the M bit signal M1, which is a detecting output signal is "H" level, whereas the signal M1 is "L" level.

Figure 3:
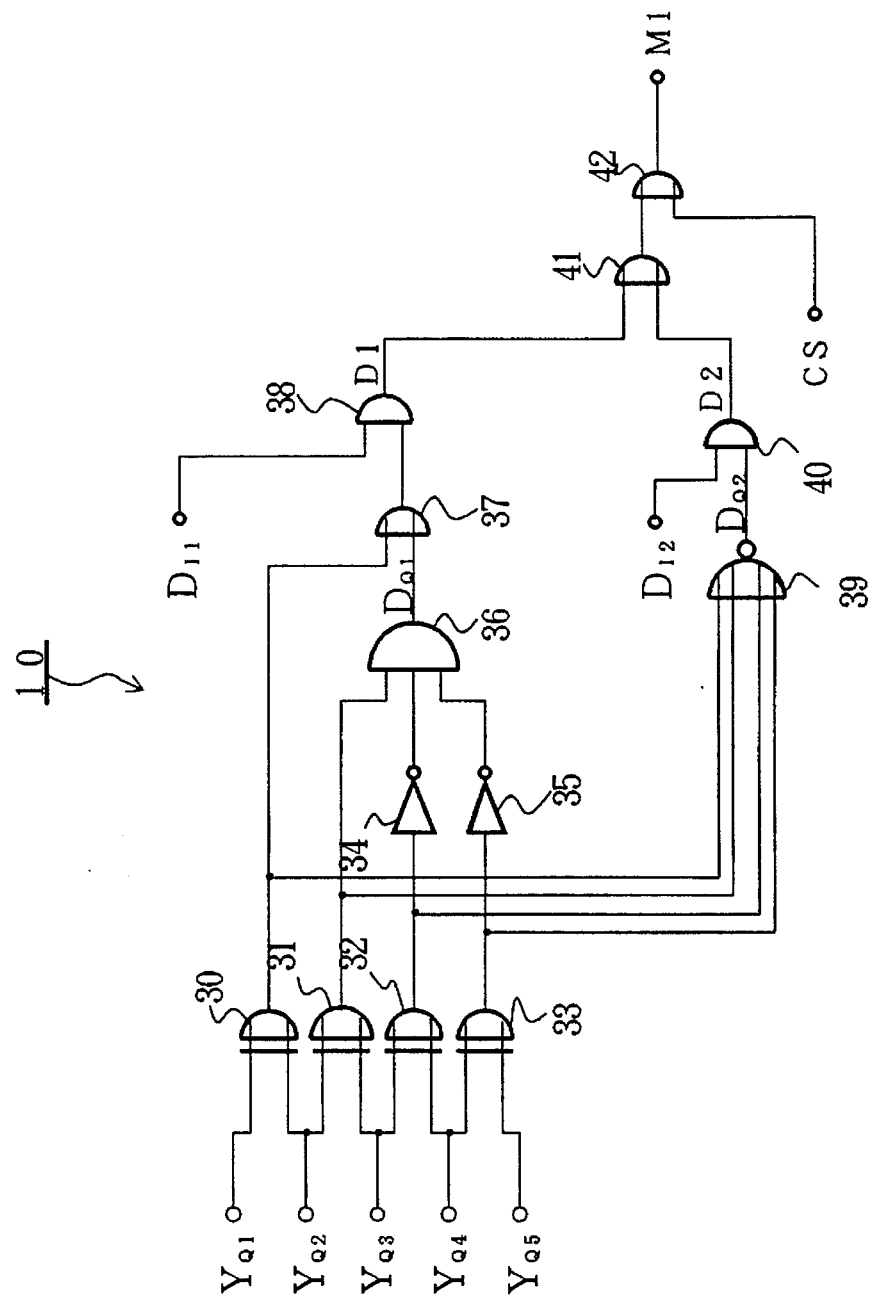
FIG. 3 is a schematic circuit diagram showing a structure of an M bit generator shown in FIG. 1.

FIG. 3 shows a schematic circuit diagram of the M bit generator 10. Only a Qch M bit generator 10 for Qch is shown in FIG. 3, because an Ich M bit generator 10 for Ich has the same structure as that of the Qch M bit generator 10.

In FIG. 3, reference numerals 30, 31, 32 and 33 are EXclusive OR circuits (hereinafter referred as to EXOR circuits). Numerals 34 and 35 are inverter circuits, 36 is an AND circuit having three input terminals, 37 is an OR circuit having two input terminals, 38 is an AND circuit having two input terminals, 39 is a NOR circuit having four input terminals, 40 is an AND circuit having two input terminals, and 41 and 42 are OR circuits having two input terminals.

Figure 4:
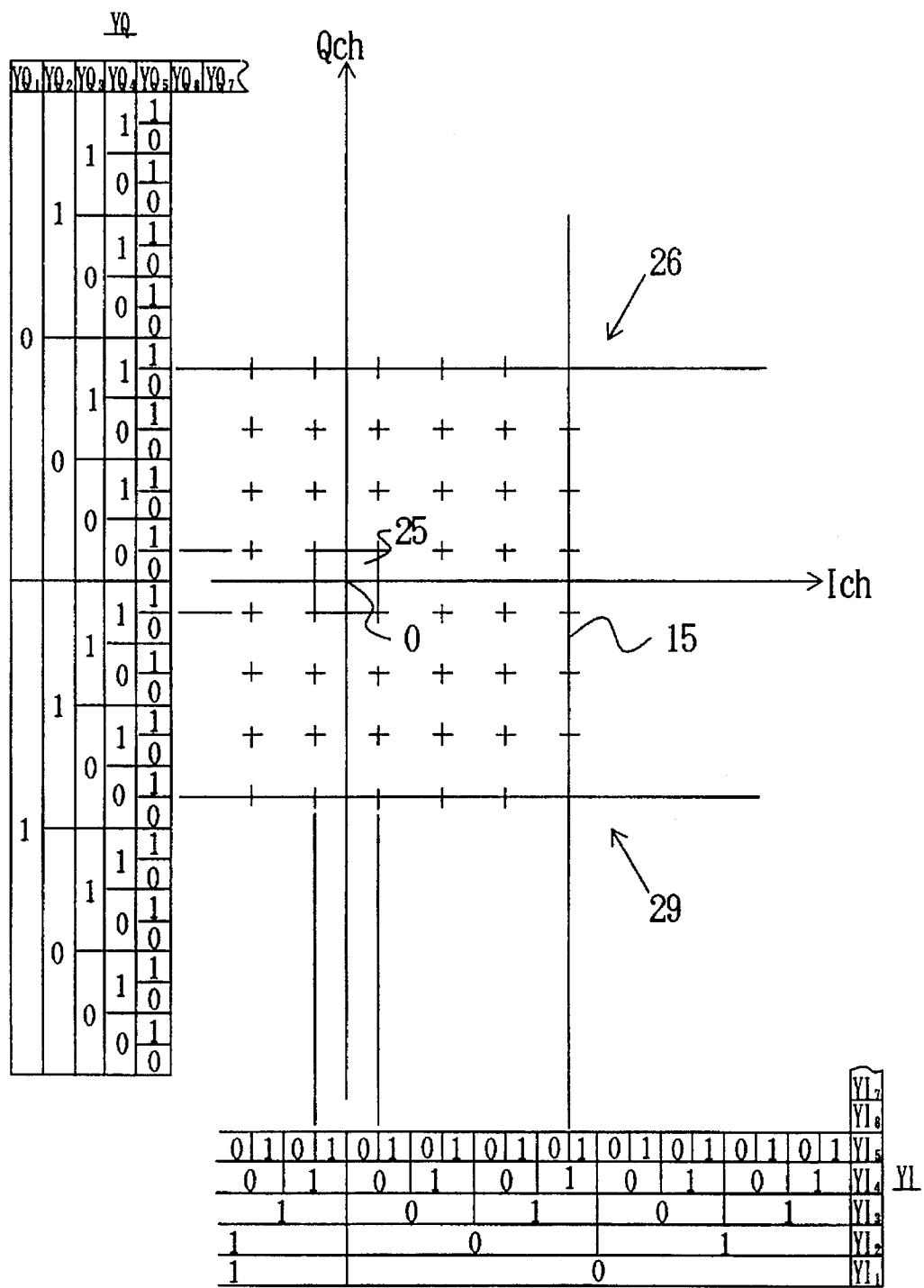
FIG. 4 is a diagram for explaining the relation between an adaptively-equalized data and constellation of signal points for 64QAM.

The constellation of signal points shown in FIG. 4 in the case of the Ich and Qch adaptively-equalized data $Y_I$ and $Y_Q$ and 64QAM will be considered. That is, as shown in FIG. 4, each of the signal points of 64QAM is shown with each 5 bits of $Y_{I1}$ to $Y_{I5}$ and $Y_{Q1}$ to $Y_{Q5}$.

Returning back to FIG. 3, the first bit of data $Y_{Q1}$ and the second bit of data $Y_{Q2}$ selected from the Qch adaptively-equalized data $Y_Q$ are inputted to the EXOR circuit 30. The second bit of data $Y_{Q2}$ and the third bit of data $Y_{Q3}$ are inputted to the EXOR circuit 31. The third bit of data $Y_{Q3}$ and the fourth bit of data $Y_{Q4}$ are inputted to the EXOR circuit 32. The fourth bit of data $Y_{Q4}$ and the fifth bit of data $Y_{Q5}$ are inputted to the EXOR circuit 33.

Each of the output terminals of the EXOR circuits 30 through 33 is connected to each of input terminals of the NOR circuit 39, and together the output terminal of the circuit 30 is connected to one input terminal of the OR circuit 37, the output terminal of the EXOR circuit 31 is connected to the first input terminal of the AND circuit 36, the output terminal of the EXOR circuit 32 is connected to the second input terminal of the AND circuit 36 via the inverter circuit 34, and the output terminal of the EXOR circuit 33 is connected to the third input terminal of the AND circuit 36 via the inverter circuit 35.

The output terminal of the AND circuit 36 is connected to another input terminal of the OR circuit 37.

As described above, the EXOR circuits 30 to 33 are for the Qch circuit, and there are the circuits having the same structure for the Ich circuit, not shown in the diagram. The upper level of 5 bit of data $Y_{I1}$, $Y_{I2}$, $Y_{I3}$, $Y_{I4}$ and $Y_{I5}$ of the Ich adaptively-equalized data $Y_I$ are inputted to Ich EXOR circuits corresponding to the Qch EXOR circuits 30 to 33.

In FIG. 3, $D_{I1}$ is used as a data outputted from the Ich OR circuit corresponding to the OR circuit 37, and $D_{I2}$ is used as a data outputted from the Ich NOR circuit corresponding to the NOR circuit 39.

The output terminal of the OR circuit 37 is connected to one input terminal of the AND circuit 38, the output terminal of the Ich OR circuit corresponding to the OR circuit 37 to another input terminal of the AND circuit 38, the output terminal of the NOR circuit 39 to one input terminal of the AND circuit 40, and the output terminal of the Ich NOR circuit corresponding to the NOR circuit 39 to another input terminal of the AND circuit 40.

D1 is used as the output data of the AND circuit 38, and D2 is used as the output data of the AND circuit 40. More particularly, D1 becomes a data which judges whether or not the signal points+shown in FIG. 2 exist in the first to fourth outside areas 26 through 29. When the signal points exist in the outside areas, the signal becomes "H" level, whereas the signal becomes "L" level. Hereinafter, the D1 is called as the outside area judging data.

That is, it is apparent from the diagram showing the relation in FIG. 4 that at least the first and second bits and $Y_{Q2}$ of the Qch data are "1, 0" or "0, 1", and the first and second bits $Y_{I1}$ and $Y_{I2}$ of the Ich data are "1, 0" or "0, 1", when the signal points+exists in the first to fourth outside areas 26 to 29. The EXOR circuit 30 detects the data.

Further, D2 is a data judging whether or not the signal points+exist in the central area 25. When the signal points exist in the central area, the signal becomes "H" level, whereas the signal becomes "L" level. Hereinafter, D2 is called as the central area judging data.

As shown in FIG. 3, the output terminal of the AND circuit 38 is connected to one input terminal of the OR circuit 41, the output terminal of the AND circuit 40 to another input terminal of the OR circuit 41, and the output terminal of the OR circuit 41 to one input terminal of the OR circuit 42. Further, the control signal CS which is a signal when out-phase is detected is inputted to another input terminal of the OR circuit 42, and the M bit signal M1 is outputted from the OR circuit 42.

The reason why the upper level of 5 bit of the Qch and Ich adaptively-equalized data $Y_{Q1}$, $Y_{Q2}$, $Y_{Q3}$, $Y_{Q4}$, $Y_{Q5}$ and $Y_{I1}$, $Y_{I2}$, $Y_{I3}$, $Y_{I4}$, $Y_{I5}$ are inputted will be explained referring to FIG. 4.

The adaptively-equalized data $Y_I$ and $Y_Q$ are outputted from an adder 62 of the adaptive transversal filter 7 shown in FIG. 9, explained later, and distinguished with fineness of 24 bits by the distinguishing section 63. It is ideal that the signal points are positioned so as to have ½ size of the dynamic range of the adder 62. Further, the phase of the adaptively-equalized data $Y_I$ and $Y_Q$ are shifted at 90 degrees on space, so that it is expressed as shown in FIG. 4.

That is, the first bit of the Qch data $Y_{Q1}$ is considered as a polarity signal, which alternates between the both sides of a boundary, that is, the origin 0 of I-Q axes, as shown in FIG. 4. The first bit of the Ich data $Y_{I1}$ is also a polarity signal, which alternates between the both sides of the origin 0 of I-Q axes. As the result, the first quadrant to the fourth quadrant of the I-Q axes can be distinguished by the first bits of the Qch and Ich data $Y_{Q1}$ and $Y_{I1}$. For example, "0" of the data $Y_{Q1}$ and "0" of the data $Y_{I1}$ mean the first quadrant.

The second bits of data $Y_{Q2}$ and $Y_{I2}$ which are positioned on a half-cycle of the first bits of data $Y_{Q1}$ and $Y_{I1}$ are considered as signals alternating between the area where the signal points are in each quadrant (square area 15) and the area where the signal points does not exist (including the first to the fourth outside areas 26 to 29). As the result, the square area 15 and the first to the fourth outside areas 26 to 29 can be distinguished by the upper data of two bits, $Y_{Q1}$, $Y_{Q2}$ and $Y_{I1}$ and $Y_{I2}$.

For example, "0, 1" of the data $Y_{Q1}$ and $Y_{Q2}$ and "0, 1" of the data $Y_{I1}$ and $Y_{I2}$ mean the first outside area 26. "1, 1" of the data $Y_{Q1}$ and $Y_{Q2}$ and "0, 0" of the data $Y_{I1}$ and $Y_{I2}$ show the fourth quadrant of the square area 15.

In this way, the fifth bit of the data $Y_{Q5}$ and $Y_{I5}$ in the data set of which lower level is ½ of the upper data can specify each of the signal points shown+marks in the diagram. As the result, the central area 25 can be distinguished by the upper data of 5 bits, $Y_{Q1}$, $Y_{Q2}$, $Y_{Q3}$, $Y_{Q4}$, $Y_{Q5}$, and $Y_{I1}$, $Y_{I2}$, $Y_{I3}$, $Y_{I4}$, $Y_{I5}$.

For example, "0, 0, 0, 0, 0" of $Y_{Q1}$, $Y_{Q2}$, $Y_{Q3}$, $Y_{Q4}$, $Y_{Q5}$ and "1, 1, 1, 1, 1" of $Y_{I1}$, $Y_{I2}$, $Y_{I3}$, $Y_{I4}$, $Y_{I5}$ show the second quadrant of the central area 25.

It is apparent from the above-described explanation that the M bit generator 10 can perform the judgment of the outside areas 26 through 29 shown in FIG. 4 with the upper data of the five bits of the Qch and Ich adaptively-equalized data $Y_{Q1}$, $Y_{Q2}$, $Y_{Q3}$, $Y_{Q4}$, $Y_{Q5}$, and $Y_{I1}$, $Y_{I2}$, $Y_{I3}$, $Y_{I4}$, $Y_{I5}$.

For example, If "0, 0, 0, 0, 0" of $Y_{I1}$, $Y_{I2}$, $Y_{I3}$, $Y_{I4}$, $Y_{I5}$ are inputted to the Qch circuit of the M bit generator 10 shown in FIG. 3, the output data $D_{Q1}$ of the OR circuit 36 becomes "L" level, and the output data $D_{Q2}$ of the NOR circuit 39 becomes "H" level.

Meanwhile, if "0, 0, 0, 0, 0" of $Y_{I1}$, $Y_{I2}$, $Y_{I3}$, $Y_{I4}$, $Y_{I5}$ are inputted to the EXOR circuits 30 to 33 of the Ich circuit of the M bit generator 10, not shown in the diagram, the data $D_{I1}$ becomes "L" level, and the data $D_{Q2}$ becomes "H" level.

As the result, both $D_{Q1}$ and $D_{I1}$ which are two input data of the AND circuit 38 shown in FIG. 3 become "L" level, and the outside area judging data D1, which is an output from the AND circuit 38 becomes "L" level. Similarly, both $D_{Q2}$ and $D_{I2}$ which are two input data of the AND circuit 40 shown in FIG. 3 become "H" level and the central area judging data D2 becomes "H" level.

Then, It becomes apparent from the above-explanation that the signal points exist in the central area 25 because the outside area judging data D1 becomes "L" level, and the central area judging data D2 becomes "H" level, so that the M bit signal M1 outputted from the OR circuit 42 becomes "H" level.

Further, if "0, 0, 1, 0, 0" of $Y_{Q1}$, $Y_{Q2}$, $Y_{Q3}$, $Y_{Q4}$, $Y_{Q5}$ are inputted to the Qch circuit shown in FIG. 3, the data $D_{Q1}$ becomes "L" level, and the data $D_{Q2}$ becomes "L" level. Meanwhile, if "0, 0, 0, 1, 1" of $Y_{I1}$, $Y_{I2}$, $Y_{I3}$, $Y_{I4}$, $Y_{I5}$ are inputted to the Ich circuit, the data $D_{I1}$ becomes "L" level, and the data $D_{I2}$ becomes "H" level.

As the result, the outside area judging data D1 becomes "L" level, and the central area judging data D2 becomes "L" level. Then, It becomes apparent that the signal points do not exist in the central area 25, and the outside areas 26 through 29. When the control signal CS is "L" level showing the asynchronous mode at that time, the M bit signal M1 becomes "L" level.

The M bit signal M1 becomes "H" level in the case where the control signal CS is "H" level showing the synchronous mode.

The gain control voltage generator 8 shown in FIG. 1 generates the data for reducing the amplitude because the amplitude is larger, in the case where the signal points of the inputted adaptively-equalized data $Y_I$ and $Y_Q$ exist in the first to the fourth outside areas 26 through 29, and generates the data for increasing the amplitude because the amplitude is smaller, in the case where the signal points exist in the central area 25.

Further, the generator 8 generates the data for reducing the amplitude in the case where the amplitude is larger than the reference level, and generates the data for increasing the amplitude in the case where the amplitude is smaller than the reference level on the basis of the judgment whether or not the amplitude is larger than the reference level in the areas out of the areas 26 to 29 and the area 25.

The gain control voltage generator 8 controls according to the judgment whether or not the signal points of the inputted adaptively-equalized data $Y_I$ and $Y_Q$ exist in the first to fourth outside areas 26 to 29 or the central area 25, based on the M1 outputted from the M bit generator 10 shown in FIG. 3, explained above, which is inputted to the generator 8.

Figure 5:
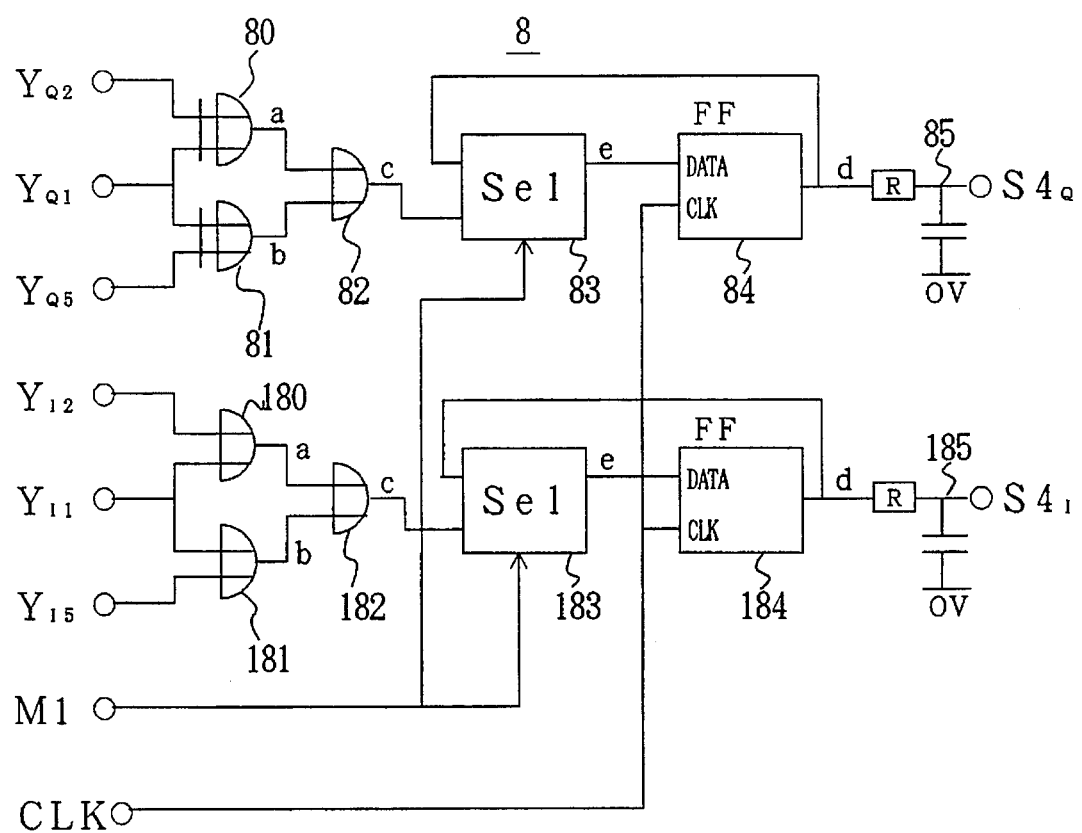
FIG. 5 is a schematic circuit diagram showing a structure of a gain control voltage generator shown in FIG. 1.

FIG. 5 is a block diagram of a structural diagram of gain control voltage generator 8 shown in FIG. 1. In FIG. 5, the gain control voltage generator 8 includes EXOR circuits 80 and 81, a selector 83, a flip-flop FF 84, an integration circuit 85 to generate a Qch gain control signal $S4_Q$. The generator 8 similarly includes EXOR circuits 180 and 181, a selector 183, a flip-flop FF 184 and an integration circuit 185 to generate an Ich gain control signal $S4_I$.

The first, second and fifth bits of $Y_{Q1}$, $Y_{Q2}$, $Y_{Q5}$, and $Y_{I1}$, $Y_{I2}$, $Y_{I3}$ selected from the outputs of the adaptive transversal filter 7 are inputted to the Qch EXOR circuits 80 and 81 and the Ich EXOR circuits 180 and 181, respectively.

Consequently, in the diagram, the output a of the EXOR circuit 80 is an EXOR output between $Y_{Q1}$ and $Y_{Q2}$, and the output a of the EXOR circuit 180 is an EXOR output between $Y_{I1}$ and $Y_{I2}$, respectively. The EXOR circuits 80 and 180 output a logic "1" when the signal points of the received IF signal exist out of the signal point (shown by+marks) area 15 shown in FIG. 4, and output a logic "0" when the signal points exist in the signal point area 15.

The output b of the EXOR circuit 81 is an EXOR output between $Y_{Q1}$ and $Y_{Q2}$, and the output b of the EXOR circuit 181 is an EXOR output between $Y_{I1}$ and $Y_{I2}$. The outputs give the limitation to the signals in the areas out of the signal point area 15 shown in FIG. 4.

The output c are OR outputs of the outputs a and the output b respectively outputted from the OR circuits 82 and 182. The outputs c become limited amplitude control signals. The outputs e are signals outputted from the selectors 83 and 183 by switching the data delayed one bit, i.e., the outputs of the flip-flops FF 84 and 184 and the outputs of the OR circuits 82 and 182 with the M1 signal.

The selectors 83 and 183 select the outputs c outputted from the OR circuits 82 and 182, when the M1 signal outputted from the M bit generator 10 is "H" level, and keep the outputs outputted from the flip-flops FF 84 and 183, i.e., data immediately before generating, when the M1 signal is "L" level, described above.

After then, analog signals, i.e., gain control signals $S4_Q$ and $S4_I$ are outputted by integrating with the RC integration circuits 85 and 185. In this way, the gain control signals $S4_I$ and $S4_Q$ are generated.

Then, the gain control signals $S4_I$ and $S4_Q$ are outputted to the amplifier 4, when the M bit signal M1 is "H" level, the data immediately before generating is kept, when the signal M1 is "L" level, and the gain control signals $S4_I$ and $S4_Q$ generated from the kept data are outputted to the amplifier 4.

When the input signal IF is synchronized, or the signal point exists in either the outside areas 26 to 29 or the central area 25, at the asynchronous mode, the M bit signal M1 becomes "H" level.

When the signal IF is synchronized, the signal point is static in the square area 15 which is the signal point area. Then, the gain control voltage generator 8 outputs the gain control signals $S4_I$ and $S4_Q$ generated by the judgment whether or not the amplitude is larger than the reference level, as described above.

Meanwhile, when the signal IF is not synchronized, and the signal point exists in either the areas 26 to 29 or the area 25, the gain control voltage generator 8 generates the data of which signal point exists in the areas 26 to 29 or the area 25, i.e., the same data as the case where the M bit signal M1 is "H" level.

Accordingly, if the gain control signals $S4_I$ and $S4_Q$ can be obtained according to the data that has generated the M bit signal M1, at the time when the "H" level of the M bit signal M1 is inputted to the gain control voltage generator 8, it is possible to exactly judge the amplitude level in the areas 26 to 29 and the area 25, even if the signal is not synchronized and the signal point rotates. Therefore, it is also possible to reach the gain of the gain control signals $S4_I$ and $S4_Q$ up to the same control gain as that in the synchronous mode.

When the M bit signal M1 is "L" level, as the gain control voltage generator 8 keeps and outputs the gain control signals $S4_I$ and $S4_Q$ according to the previous data, the gain control signals $S4_I$ and $S4_Q$ can have gain, which has reached up to the same control gain level as that in the synchronous mode.

Returning to FIG. 1, the offset M bit generator 13 outputs the M bit signal M2 that instructs the offset control voltage generator 12 to output the offset control signals $S5_I$ and $S5_Q$. When the control signal CS shows the asynchronous mode, the M bit signal M2 of "H" level is outputted, whereas the M bit signal M2 of "H" level or "L" level obtained from the result of the area judgment, described later, on phase plane shown in FIG. 6.

Figure 6:
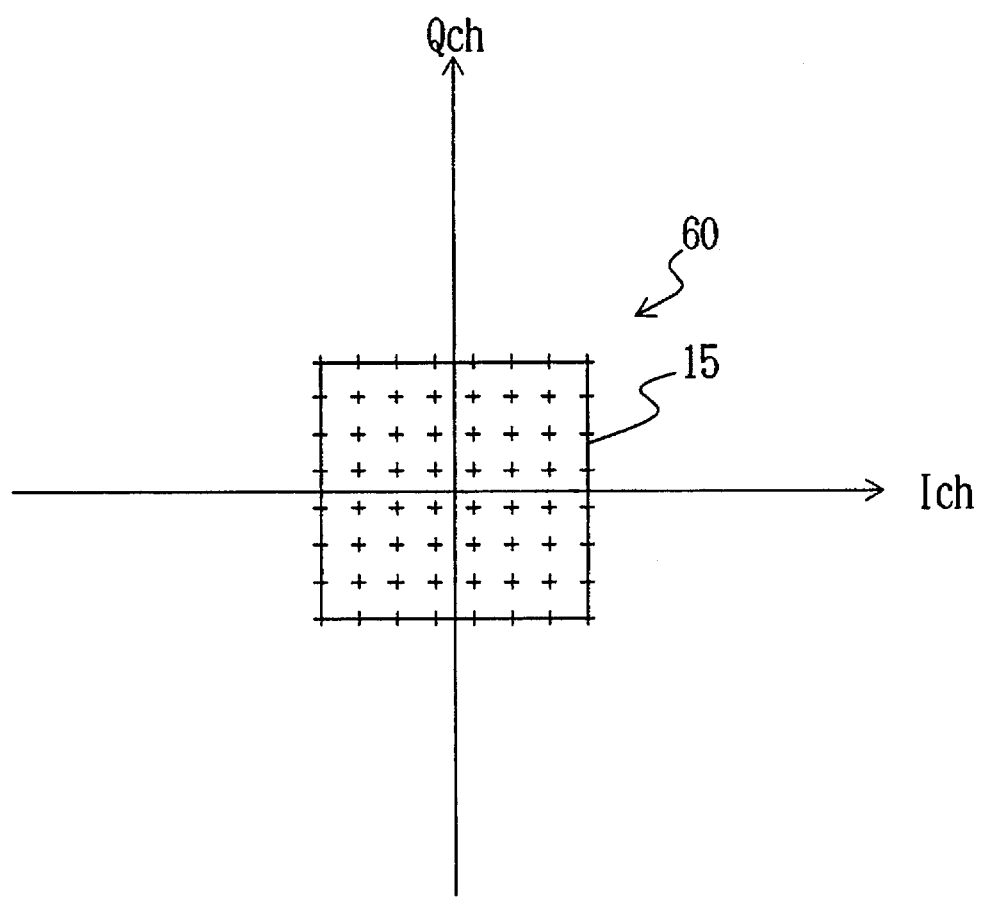
FIG. 6 is a diagram showing an offset control area of the embodiment shown in FIG. 1.

FIG. 6 is a diagram showing the offset control area on the phase plane in the Ich and Qch orthogonal axes of the 64 level QAM intermediate frequency signal IF, according to the embodiment of the present invention. In FIG. 6, reference numerals 15 and 60 mean a square area and an area out of the square area 15, respectively. When the offset M bit generator 13 judges the areas by detecting whether or not the signal points exist in the outside area 60.

Figure 7:
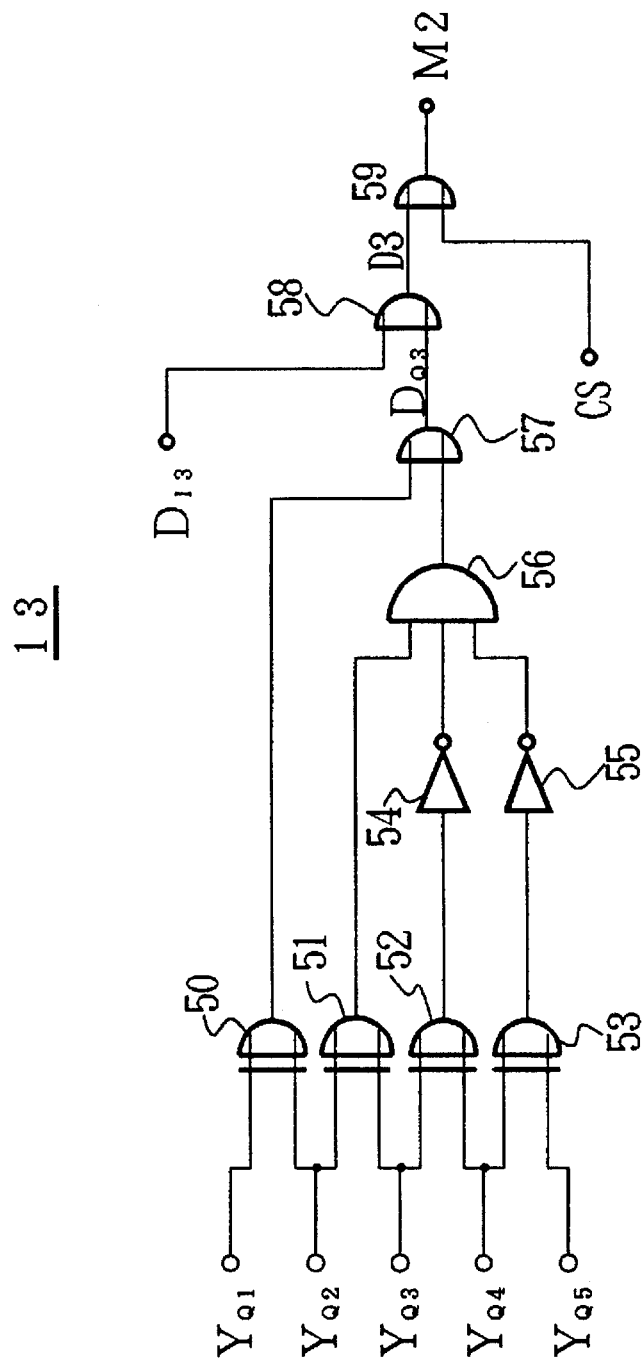
FIG. 7 is a schematic circuit diagram showing a structure of an offset M bit generator shown in FIG. 1.

In the case where the signal points exist in the square area 15, the M bit signal M2 is "H" level, whereas the signal is "L" level. FIG. 7 shows a schematic circuit diagram of the offset M bit generator 13. The offset M bit generator 13 will be explained on reference to FIG. 7 as follows.

In FIG. 7, reference numerals 50, 51, 52 and 53 are EXOR circuits, 54 and 55 are inverter circuits, 56 is an AND circuit having three input terminals, 57 is an OR circuit having two input terminals, and 58 and 59 are OR circuits having two input terminals.

The Ich and Qch adaptively-equalized data $Y_I$ and $Y_Q$ inputted to the offset M bit generator 13 are same as those inputted to the M bit generator 10 described referring to FIG. 4.

The first bit of the data $Y_{Q1}$ and the second bit of the data $Y_{Q2}$ selected from the Qch adaptively-equalized data $Y_Q$ are inputted to the EXOR circuit 50, the second bit of the data and the third bit of the data $Y_{Q3}$ are inputted to the circuit 51, the third bit of the data $Y_{Q3}$ and the fourth bit of the data $Y_{Q4}$ are inputted to the circuit 52, and the fourth bit of the data $Y_{Q4}$ and the fifth bit of the data $Y_{Q5}$ are inputted to the circuit 53.

The output terminal of the EXOR circuit 50 is connected to one input terminal of the OR circuit 57, the output terminal of the circuit 51 is inputted to the first input terminal of the AND circuit 56, the output terminal of the circuit 52 is inputted to the second input terminal of the AND circuit 56 via the inverter circuit 54, the output terminal of the circuit 53 is inputted to the third input terminal of the AND circuit 56 via the inverter circuit 55, and the output terminal of the AND circuit 56 is inputted to another input terminal of the OR circuit 57.

In FIG. 7, the above-described circuit is used for the Qch circuit, and there is another circuit for the Ich side, which has the same structure, not shown in the diagram. The upper 5 bit data, $Y_{I1}, Y_{I2}, Y_{I3}, Y_{I4}, Y_{I5}$ are inputted to the Ich circuit.

$D_{I3}$ is used as the data outputted from the OR circuit for the Ich circuit corresponding to the OR circuit 57. As described in FIG. 7, both $D_{I3}$ and $D_{Q3}$ from the OR circuit 57 for Qch circuit are inputted to the OR circuit 58.

D3 is employed as an output data of the OR circuit 56. In this embodiment, D3 is the data that judges whether or not the signal points of the received IF signal+shown in FIG. 6 exist in the outside area 60. When the signal points exist in the output area 60, the signal D3 becomes "H" level, whereas the signal becomes "L" level. Hereinafter D3 is called as an outside area judging data.

The output terminal of the OR circuit 58 shown in FIG. 7 is connected to one input terminal of the OR circuit 59, and further, the control signal CS is inputted to another input terminal of the OR circuit 59, and the M bit signal M2 is outputted from the OR circuit 59.

For example, if "0, 1, 0, 0, 0" of $Y_{Q1}, Y_{Q2}, Y_{Q3}, Y_{Q4}, Y_{Q5}$ are inputted to the Qch offset M bit generator 13 having the above-described structure, the output data $D_{Q3}$ of the OR circuit 57 becomes "H" level. Meanwhile, if "0, 0, 1, 1, 1" of $Y_{I1}, Y_{I2}, Y_{I3}, Y_{I4}, Y_{I5}$ are inputted to the Ich circuit of the M bit generator 13, not shown in the diagram, the data $D_{I3}$ becomes "H" level.

In this way, if the outside area judging data $D_{Q3}$ or $D_{I3}$ becomes "H" level and it is apparent from the result that the signal points exist in the outside area 60 (refer to FIG. 6), the M bit signal M2 outputted from the OR circuit 59 becomes "H" level.

If "0, 0, 1, 0, 0" of $Y_{Q1}, Y_{Q2}, Y_{Q3}, Y_{Q4}, Y_{Q5}$ are inputted to the Qch circuit, the data $D_{Q3}$ becomes "L" level, and if "0, 0, 0, 1, 1" of $Y_{I1}, Y_{I2}, Y_{I3}, Y_{I4}, Y_{I5}$ are inputted to the Ich circuit, the data $D_{I3}$ becomes "L" level.

If the outside area judging data $D_{Q3}$ or $D_{I3}$ becomes "L" level, and it is apparent that the signal points do not exist in the outside area 60, the M bit signal M2 becomes "L" level.

Further, the M bit signal M2 becomes "H" level, in the case where the control signal CS is "H" level that shows the synchronous mode, regardless of level of the outside area judging data $D_{Q3}$ or $D_{I3}$.

The offset control voltage generator 12 shown in FIG. 1 outputs the offset control signals $S5_I$ and $S5_Q$, in only the case where the signal points of the inputted adaptively-equalized data $Y_I$ and $Y_Q$ exist in the outside area 60.

That is, the offset control voltage generator 12 outputs the offset control signals $S5_I$ and $S5_Q$, according to the adaptively-equalized data $Y_I$ and $Y_Q$, in only the case where the M bit signal M2 having "H" level is generated, by judging that the input signal IF is in the asynchronous mode, and the signal points of the signal IF exist in the outside area 60 in the offset M bit generator 13.

The offset controller 5 controls the offset according to the offset control signals $S5_I$ and $S5_Q$. A convergent point of the control becomes such a state that the signal points shown by+marks in FIG. 6 are rotated around the origin of I–Q axes, when the input signal IF is in the asynchronous mode. That is, the signal points are balanced with bi-symmetrical signal points, so that the offset controller can be exactly controlled.

Figure 8:
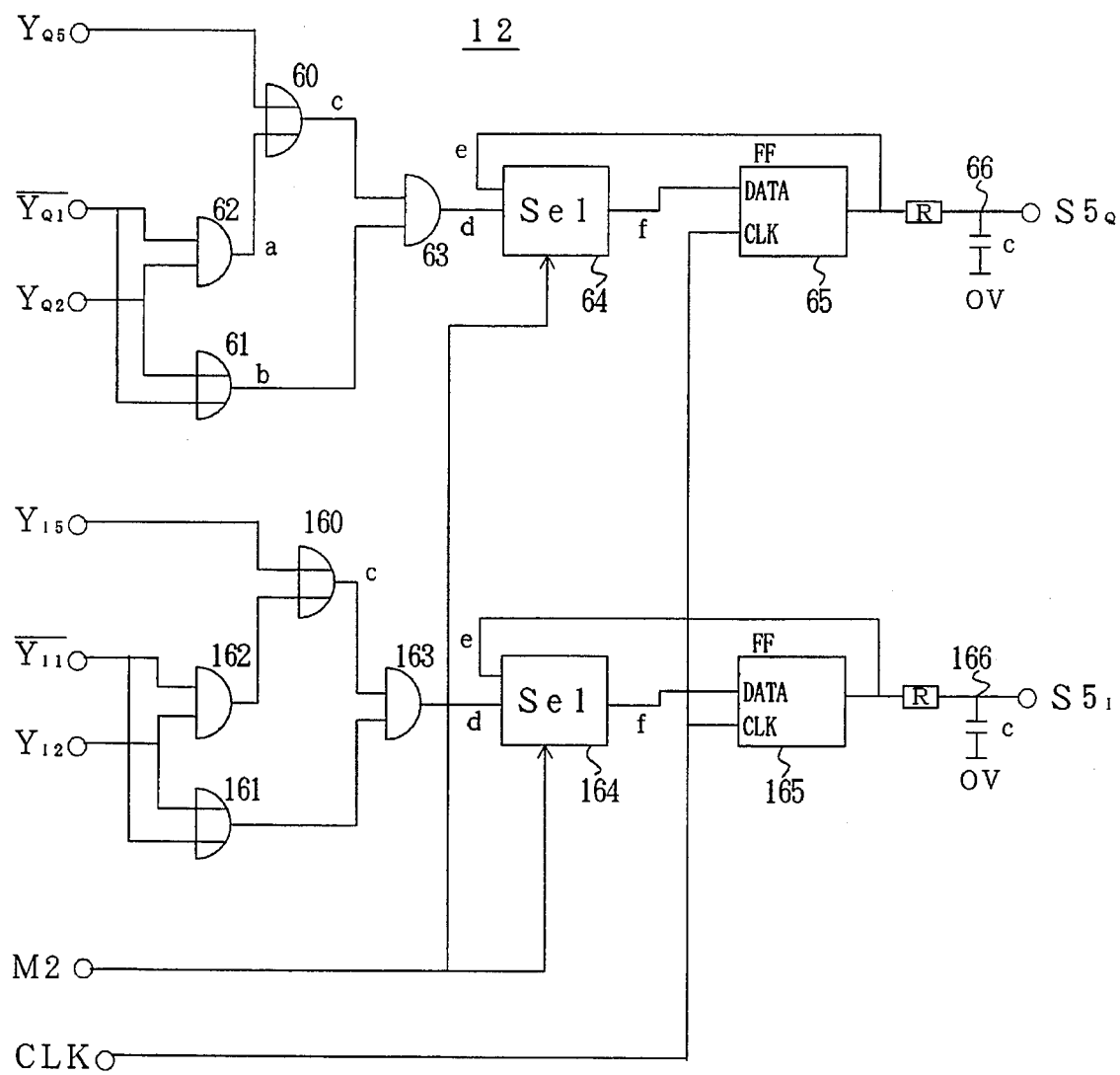
FIG. 8 is a schematic circuit diagram showing a structure of an offset control voltage generator shown in FIG. 1.

FIG. 8 is a structural diagram of an offset control voltage generator 12 that generates the signal $S_{Q5}$ for the Qch. In FIG. 8, the Qch offset control voltage generator 12 includes AND circuits 60 and 61, OR circuits 62 and 63, selectors 64, a flip-flop FF 65 and an integration circuit 66.

The $Y_{QS}$ inputted to one input terminal of the OR circuit 60 becomes the offset control signal. The output a is an AND output which is obtained by passing inverted logic of $Y_{Q1}$ and $Y_{Q2}$ via the AND circuit 62 and which is used to limit the control signal to a signal upward the signal point area 15.

The output b is an OR output which is obtained by passing an inverted logic of the $Y_{Q1}$ and $Y_{Q2}$ via the OR circuit 61 and limits the control signal to a signal downward of the signal point area 15. The output d is an AND output which is obtained by passing the outputs of the OR circuits 60 and 61 via the AND circuit 63 and which is a limited amplitude control signal.

The selector 64 switches the data e delayed by one bit, which is an output of the flip-flop FF 65 and the output d outputted from the AND circuit 63 according to the M1 signal. Then, the RC integration circuits 66 outputs the gain control signal $S5_Q$, which is an integrated analog signal.

The selector 64 selects the output d outputted from the AND circuit 63, when the M2 signal outputted from the offset M bit generator 13 is "H" level, and keeps the output outputted from the flip-flop FF 65, i.e., the previous data when the signal is "L" level.

Meanwhile, the Ich gain control signal $S5_I$ is also generated and outputted by the OR circuits 160 and 161, the AND circuits 162 and 163, the selector 164, the flip-flop FF 165 and the integration circuit 166.

Figure 9:
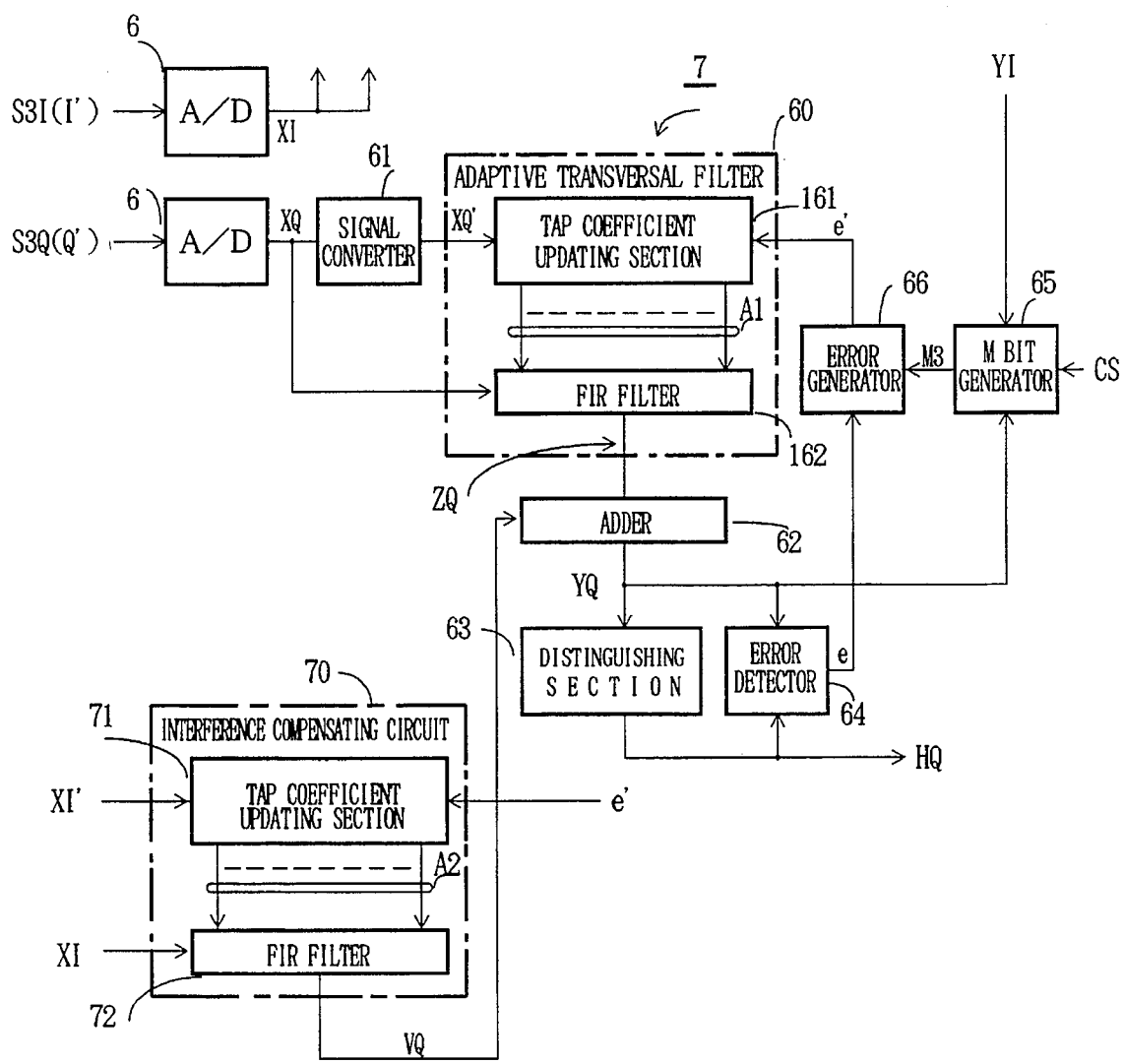
FIG. 9 is a block diagram showing a structure of an adaptive transversal filter according to the embodiment shown in FIG. 1.

FIG. 9 shows a structural diagram illustrating the inside of the adaptive transversal filter 7 shown in FIG. 1, and the inside of the adaptive transversal filter 7 will be explained as follows. The A/D converter (A/D) 6 shown in FIG. 9 has a function for converting an analog signal from the offset controller 5 shown in FIG. 1 to a digital signal.

Further, in FIG. 9, only detailed structure of the processing circuits of the Qch demodulated base band signal Q' is shown. However, the processing circuits of the Ich demodulated base band signal I' also has the same structure, which is not shown in the diagram.

In FIG. 9, reference numeral 60 is an adaptive transversal filter, 61 is a signal converter, 161 is a tap coefficient updating section, 162 is a FIR (Finite Impulse Response) filter, 62 is an adder, 63 is a distinguishing section for the signal points of the adaptively-equalized data $Y_Q$. Further, an error detector 64 compares a distinguished signal $H_Q$ with the adaptively-equalized data $Y_Q$ and detects an error signal e, an M bit generator 65 outputs the M bit signal M3, and an error generator 66 outputs by converting the error signal e to the error signal e' based on the M bit signal M3.

Furthermore, reference numeral 70 is an interference compensating circuit for compensating interference caused by waveform of orthogonal polarization side (different polarization), 71 is a tap coefficient updating section, and 72 is a FIR filter.

The adaptive transversal filter 60 automatically varies a form of a signal according to the distortion in the signal, and automatically adaptively-equalizes by employing the error signal e' to control the form variation so as that the error becomes the minimum (it is ideal that it becomes 0) to remove the distortion.

The Qch digital signal $X_Q$ converted in the A/D converter 6 is converted to a data $X_Q'$ having a fixed level of coarseness in the signal converter 61.

In the tap coefficient updating section 161 of the adaptive transversal filter 60, the arithmetic is performed to find a tap coefficient A1 for determining a waveform with the FIR filter 162. The adaptively-equalized data $Z_Q$ can be obtained by performing the convolution arithmetic between the tap coefficient A1 updated by the arithmetic and the data $X_Q$ in the FIR filter 161.

The adaptively-equalized data $Z_Q$ is added to the interference compensating signal $V_Q$ outputted from the interference compensating circuit 70 in the adder 63 to cancel the interference component with the Ich signal.

The M bit generator 65 judges whether or not the signal points exist in the first to fourth outside areas 26 through 29 and the central area 25 shown in FIG. 2 according to the adaptively-equalized data $Y_Q$ and the Ich adaptively-equalized data $Y_I$. Further, the generator 65 determines whether or not the result of the judgment should be outputted, according to the control signal CS. The control signal CS indicates the asynchronous mode, and only in the case where the asynchronous mode is shown by the control signal CS, and the signal points exist in the first to the fourth outside areas 26 through 29 and the central area 25, the M bit signal M3 is outputted.

The error generator 66 outputs the error signal e' corresponding to the input error signal e, in only the case where the M bit signal M3 is supplied.

Meanwhile, the M bit generator 65 does not output the M bit signal M3 in the case where the signal points do not exist in the first to fourth outside areas 26 through 29 and the central area 25. In this case, the error generator 66 continues outputting the error signal e' generated when the M bit signal M3 is supplied until the M bit signal M3 is supplied next.

Further, in FIG. 9, the M bit generator 65 has a same structure as the M bit generator 10 explained with reference to FIG. 3. The explanation of the M bit generator 65 will be abbreviated here. The error signal e' is outputted again in only the case where the signal points exist in the first to fourth outside areas 26 through 29 and the central area 25. Therefore, it is not influenced by the phase-rotated component when the input signal IF is in the asynchronous mode.

That is, interference component caused by such as fading can be distinguished by the error signal e'. In the tap coefficient updating section 71 of the interference compensating circuit 70, the tap coefficient A2 can be obtained by employing the data $X_I'$ converted to the data having the fixed coarseness by an Ich signal converter, not shown in the diagram, and the error signal e'. The interference compensating signal $V_Q$ can be obtained by the convolution arithmetic between the tap coefficients A2 and the Ich data $X_I$ in the FIR filter 72.

The interference-compensated signal $V_Q$ is compensated to the $Z_Q$ which is an output from the FIR filter 162 in the adder 62. Accordingly, the convergence of the tap coefficient of the adaptive transversal filter 60 can be largely improved, so that it brings large effectiveness to re-synchronize the input signal. In this way, the present invention gives the effectiveness for rapidly and stably returning the receipt carrier to the synchronous mode, when it is in the asynchronous mode.

Figure 10:
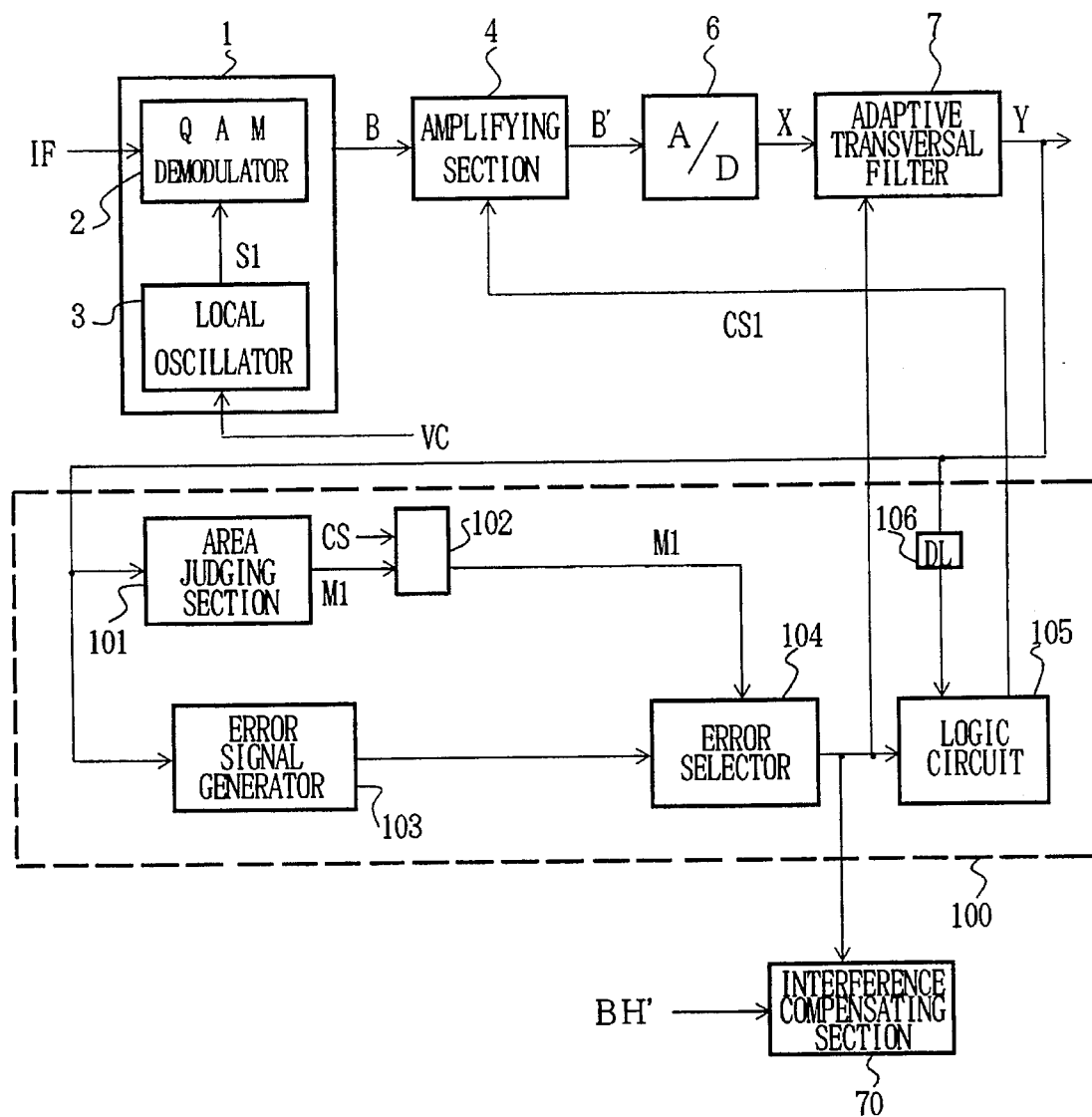
FIG. 10 is a block diagram of one embodiment of 128QAM digital multiplexing radio receiver according to the present invention.

Referring now to FIG. 10, a second embodiment according to the present invention is shown. Shown is a block diagram of the embodiment of the 128 QAM digital multiplexing radio receiver according to the present invention to overcome the shortages of the conventional receiver in the case where the signal constellation of the case of 128QAM is differed from that of the case of 64QAM, described above.

In FIG. 10, 128QAM demodulating section 1 includes a 128QAM demodulator 2 and a local oscillator 3 which is composed of the voltage controlling oscillator.

An amplifying section 4 which is composed of an arithmetic amplifier, an A/D converter 6 which converts analog signals to digital signals, and an adaptive transversal filter 7 are same as those shown in FIG. 1.

A control section 100 includes an area judging section 101, a mode switching section 102, an error signal generator 103 and an error selector 104. The control section 100 controls the adaptive transversal filter 7 with the output of the error selector 104.

The detailed control of the adaptive transversal filter at that time is same as that described in FIG. 9, i.e., the distortion of waveform is compensated by controlling to update the tap coefficients of the transversal filter by the error outputted from the error selector 104.

Further, the control section 100 includes a logic circuit 105 for obtaining an EXOR output between a polarity bit of the receipt IF signal and an error signal to decide the direction of the controlling of the amplifying section 4. A delaying circuit 106 controls a timing for inputting the equalized signal from the adaptive transversal filter 7 to the logic circuit 105.

As described in FIG. 9, the control section 100 further includes an interference-compensating section 70 (refer to reference numeral "70" shown in FIG. 9) to compensate waveform interference caused from a different polarization side.

In FIG. 10, the 128 QAM demodulator 2 demodulates the receipt IF signal corresponding to the 128QAM signal to the Ich and Qch base band demodulated signal B with a carrier signal S1 outputted from the local oscillator 3 in the same way as described referring to FIG. 1.

The Ich and Qch base band demodulated signal B is amplified in the amplifying section 4, and it becomes an amplified signal B'. Then, the amplified signal B' is converted to a digital signal X corresponding to the receipt IF signal by the A/D convertor 6.

The digital signal X is waveform-equalized in the adaptive transversal filter 7, and is inputted to the control section 100 as an equalized signal Y. The function of the control section 100 will be briefly explained according to FIG. 11, as follows.

Figure 11:
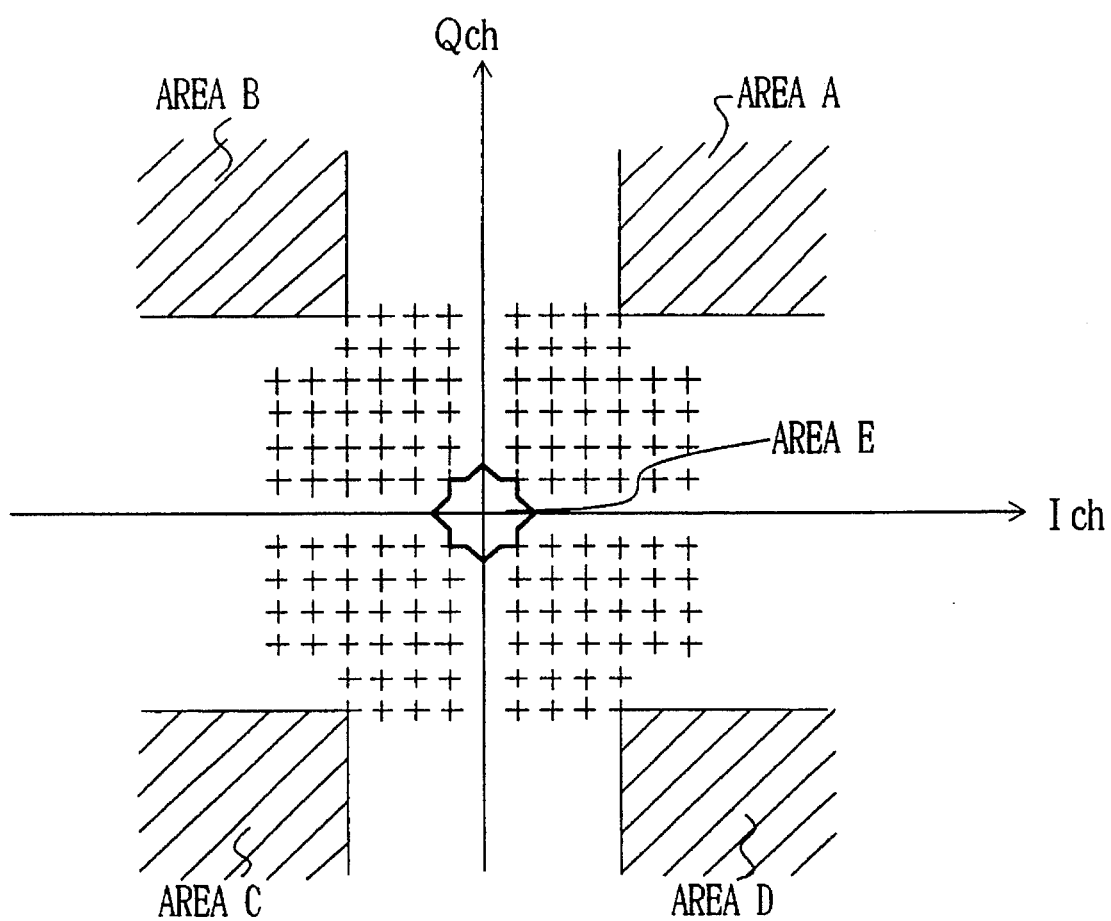
FIG. 11 is an explanatory diagram of control areas according to one embodiment shown in FIG. 10.

FIG. 11 is a diagram for conceptually explaining a control area according to the present invention. In FIG. 11, one signal point exists in the areas A, B, C and D, respectively, when the synchronization of the received 128 QAM signal is established, whereas four signal points exist in the E area.

Consequently, in FIG. 10, the control section 100 judges whether or not the signal point of the receipt signal exists in the above-described five areas. The control for the amplifier 4 and the adaptive transversal filter 7 is performed as well as the embodiment shown in FIG. 1, based on the control signal CS for specifying whether or not the signal is synchronized.

More particularly, the control section 100 outputs the signal M1 when the area judging section 101 judges that the receipt IF signal exists in the areas A to E shown in FIG. 11.

Meanwhile, the receipt IF signal is inputted to the error signal generator 103. The error signal generator 103 outputs error signals $e_Q$ and $e_I$ of 4 bits for the Ich and Qch indicating a size corresponding to a distance from signal points. The error signals $e_Q$ and $e_I$ are converted to limited signals, in the case where the distance, or the size exceeds a fixed size.

The control signal CS showing synchronous or asynchronous mode is inputted to the mode switching section 102. When the control signal CS shows the asynchronous mode, the error signals $e_Q$ and $e_I$ outputted from the error signal generator 103 are outputted as they are, in only the case where the above-explained signal M1 appears, whereas a previous data is kept.

The control for the amplifying section 4 and the adaptive transversal filter 7 is performed by the error signal of the areas A to E, when the receipt IF signal is not synchronized with the transmitted carrier signal, whereas the control is performed by the error signal at each signal point.

It is general that the possibility of missing the signal points becomes greatly higher at low C/N, and the possibility of missing the error signals $e_Q$ and $e_I$ also becomes higher in the case where the control is performed based on the error signal e of each signal point. Therefore, it becomes impossible to exactly control the amplifying section 4 and the adaptive transversal filter 7.

As compared with the above-explanation, according to the present invention, i.e., the error signal is considered only in the areas A, B, C, D and E, the distance between the areas is far, and the possibility of missing the error signal becomes smaller. Therefore, it becomes possible to exactly control the amplifying section 4 and the adaptive transversal filter 7 even at low C/N.

Further, the case where the synchronization of the received 128QAM signal is not established will be explained in detail. The signal points shown in FIG. 11 start rotating around the origin 0. In this case, the values of the error signals $e_Q$ and $e_I$ have no meanings, judging from the point of the original error signal because of the influence of phase rotation.

Accordingly, the error signals $e_Q$ and $e_I$ are outputted based on the signals in the areas A, B, C, D and E. There are eight signal points entering to the areas A, B, C and D in the case of 128QAM. That is, two numbers of signal points of which amplitude is larger than any other one exist per each area A, B, C, and D, whereas four numbers of signal points of which amplitude is smallest exist in the area E.

The area E, as shown in FIG. 11, is the section overlapped the square enclosed the minimum amplitude points with the area rotated at 45 degrees around the origin. Therefore, in the case where the minimum amplitude point rotates around the origin at 360 degrees, the signal point enters to the area E for eight times.

Accordingly, when the phase is rotated, the number of the signal points entering to the areas A, B, C and D is equal to that of signal points entering the area E, and the number of+value of the error signal is also equalized to that of—valued number.

Figure 12:
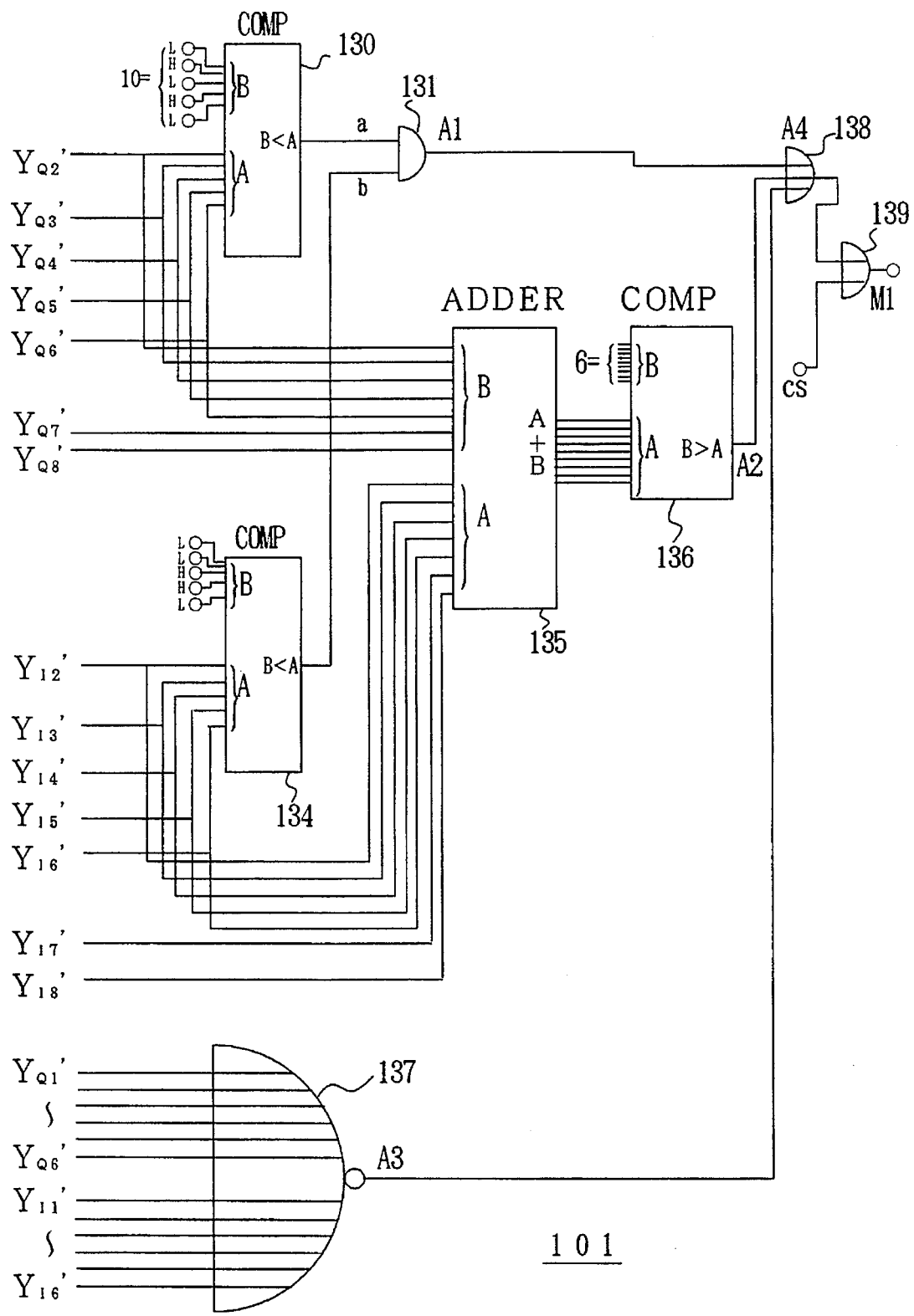
FIG. 12 is a diagram showing a structural example of an area judging section shown in FIG. 10.
Figure 13:
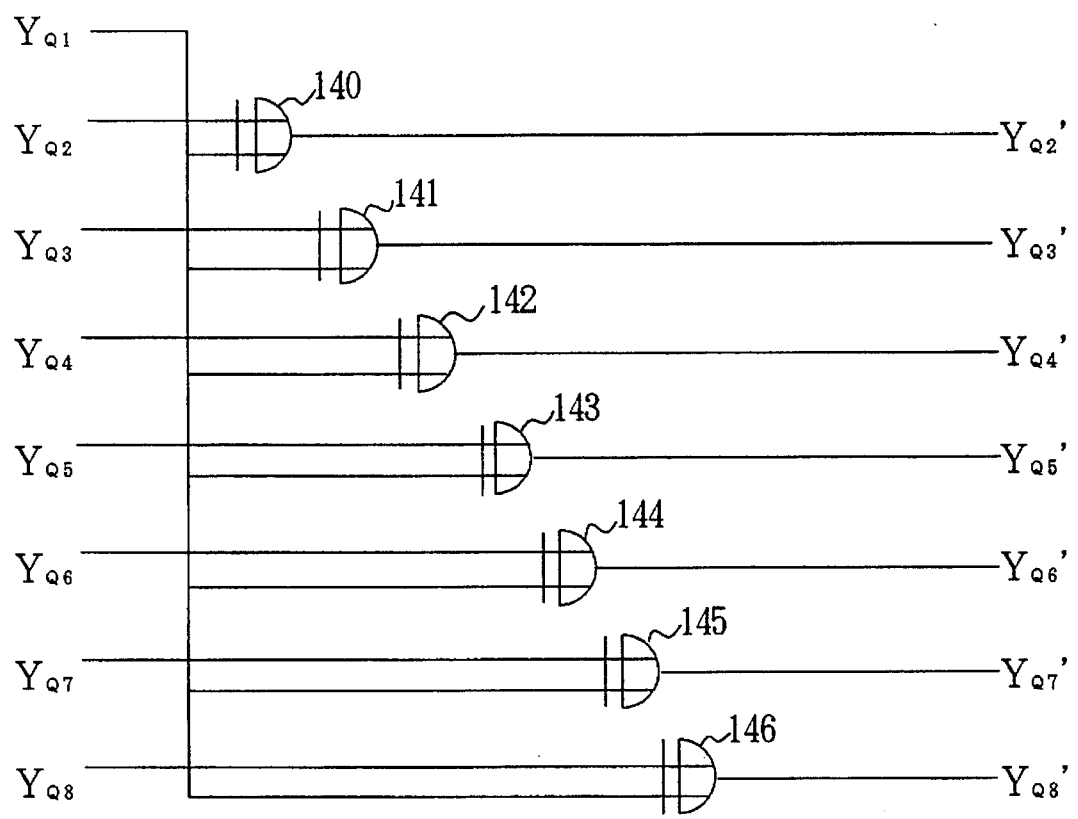
FIG. 13 is a schematic circuit diagram showing a structural example (No. 1) of absolute-value generation.
Figure 14:
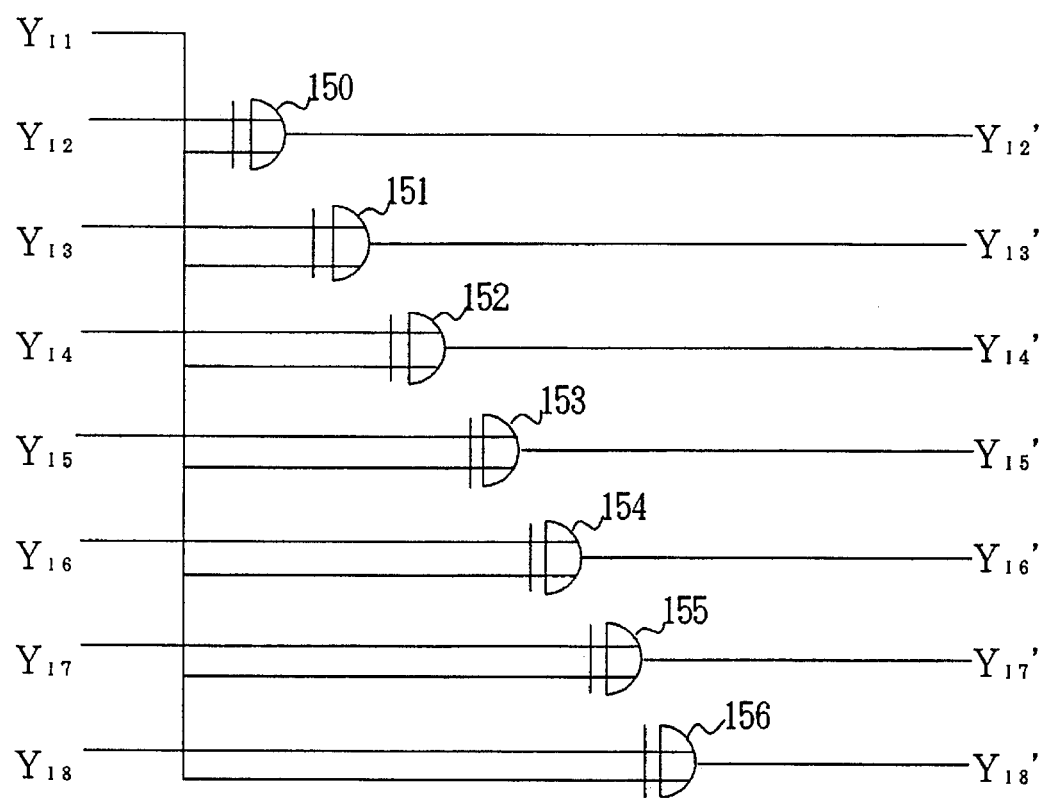
FIG. 14 is a schematic circuit diagram showing a structural example (No. 2) of absolute-value generation.
Figure 15:
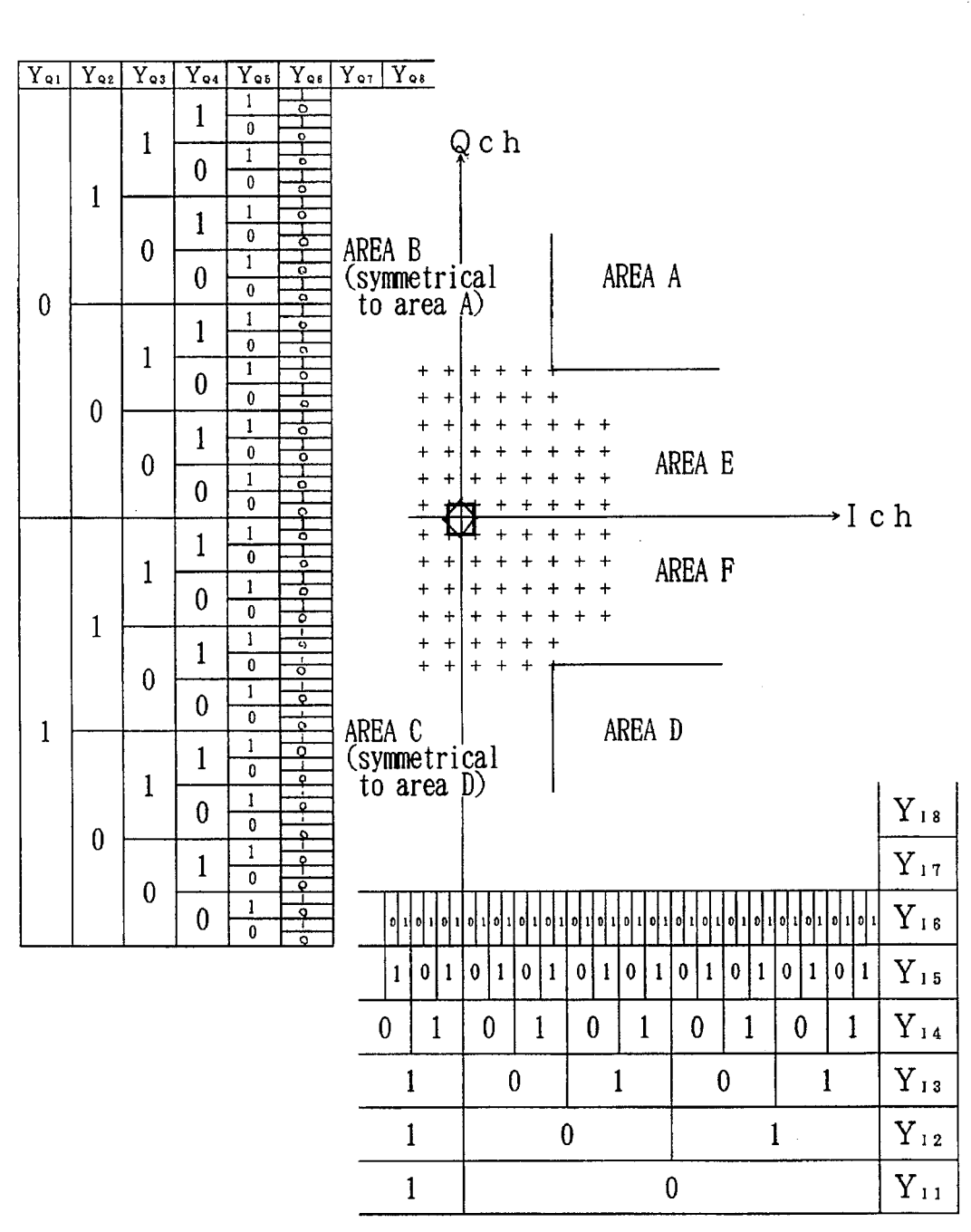

The area judging section 101 in the control section 100 is shown in FIGS. 12 to 14, as an embodiment. The constellation of 128QAM signal points which are premised of the structure of the area judging section 101 shown in FIGS. 12 to 14 is shown in FIG. 15.

The area judging section 101 which is corresponding to the M bit generator 10 (refer to FIG. 3) shown in FIG. 1 has a function for outputting the signal M1 by detecting that a received signal point of the received 128 QAM exists in either of the areas A to E.

In FIG. 12, the inputs $Y_{Q2}'$ to $Y_{Q8}'$ and $Y_{I2}'$ to $Y_{I8}'$ are absolute-value generated as shown in FIGS. 13 and 14, respectively, on the basis of the Ich and Qch equalized outputs $Y_{Q1}$ to $Y_{Q8}$ and $Y_{I1}$ to $Y_{I8}$, which are composed of 8 bits, respectively and outputted from the adaptive transversal filter 7. That is, in FIG. 13, the absolute-value $Y_{Q2}'$ can be obtained by taking EXOR between the $Y_{Q1}$ and $Y_{Q2}$ in the EXOR circuit 140.

In the same way, the absolute-value $Y_{Q3}'$ from the EXOR between the $Y_{Q2}$ and $Y_{Q3}$, the absolute-value $Y_{Q4}'$ from the EXOR between the $Y_{Q3}$ and $Y_{Q4}$, the absolute-value $Y_{Q4}'$ from the EXOR between the $Y_{Q4}$ and $Y_{Q5}$, the absolute-value $Y_{Q6}'$ from the EXOR between the $Y_{Q5}$ and $Y_{Q6}$, the absolute-value $Y_{Q7}'$ from the EXOR between the $Y_{Q6}$ and $Y_{Q7}$, and the absolute-value $Y_{Q8}'$ from the EXOR between the $Y_{Q7}$ and $Y_{Q8}$.

Similarly, the absolute-values $Y_{I2}'$ to $Y_{I8}'$ can be obtained by obtaining EXOR of the Ich outputs $Y_{Q1}$ and $Y_{Q2}$ to $Y_{Q8}$ with the EXOR circuits 150 to 156. In FIG. 12, reference numeral 130 is a comparator. The absolute-values $Y_{Q2}'$ to $Y_{Q6}'$ are inputted to the input A of the comparator 130, and the value 10 expressed with decimal number ("0 1 0 1 0" expressed with binary number) is inputted to the input B of the comparator 130.

When the $Y_{Q2}'$ to $Y_{Q6}'$ of input A of the comparator 130 is larger than the value of "0 1 0 1 1", i.e., the $Y_{Q2}$ to $Y_{Q6}$ on the Qch side is more than the value "0 1 0 1 1" (the first and second quadrants shown in FIG. 15), or the $Y_{Q2}$ to $Y_{Q6}$ on the Qch side is less than the value of "1 0 1 0 0" (the third and fourth quadrants shown in FIG. 15), "1" is inputted from the comparator 130 to the a input of the AND gate 131.

In the same way, $Y_{I2}'$ to $Y_{I6}'$ on the Ich side converted to the absolute-values in the circuit shown in FIG. 14 are inputted to the input A of the comparator 134 shown in FIG. 12. The value 6 expressed with the decimal number 6 ("0 0 1 1 0" expressed with binary number) is inputted to the input B of the comparator 134.

Consequently, when the $Y_{I2}'$ to $Y_{I6}'$ of input A of the comparator 134 is larger than the value of "0 0 1 1 0" i.e., the $Y_{I2}$ to $Y_{I6}$ on the Qch side is more than the value "0 0 1 1 1" (the first and fourth quadrants shown in FIG. 15), or the $Y_{I2}$ to $Y_{I6}$ on the Qch side is less than the value of "1 1 0 0 0" (the second and third quadrants shown in FIG. 15), "1" is inputted from the comparator 134 to the input b of the AND gate 131.

As the result, when both the inputs a and b of the AND gate 131 are "1", the signal points exist in the areas A to D shown in FIG. 15. Therefore, it means that the signal points in the areas A to D are detected, when the output A1 appears from the AND gate 131.

The $Y_{I2}'$ to $Y_{I8}'$ on the Ich side and the $Y_{Q2}'$ to $Y_{Q8}'$ on the Qch side which are converted to the absolute-values are inputted to and added by the adder 135. The result of the addition in the adder 135 is inputted to the input A of the comparator 136. The value "6" expressed by decimal number is inputted to the input B of the comparator 136. The adder 135 compares the input A with the input B and outputs A2, when the input B is larger than the input A in the adder 135.

Figure 16:
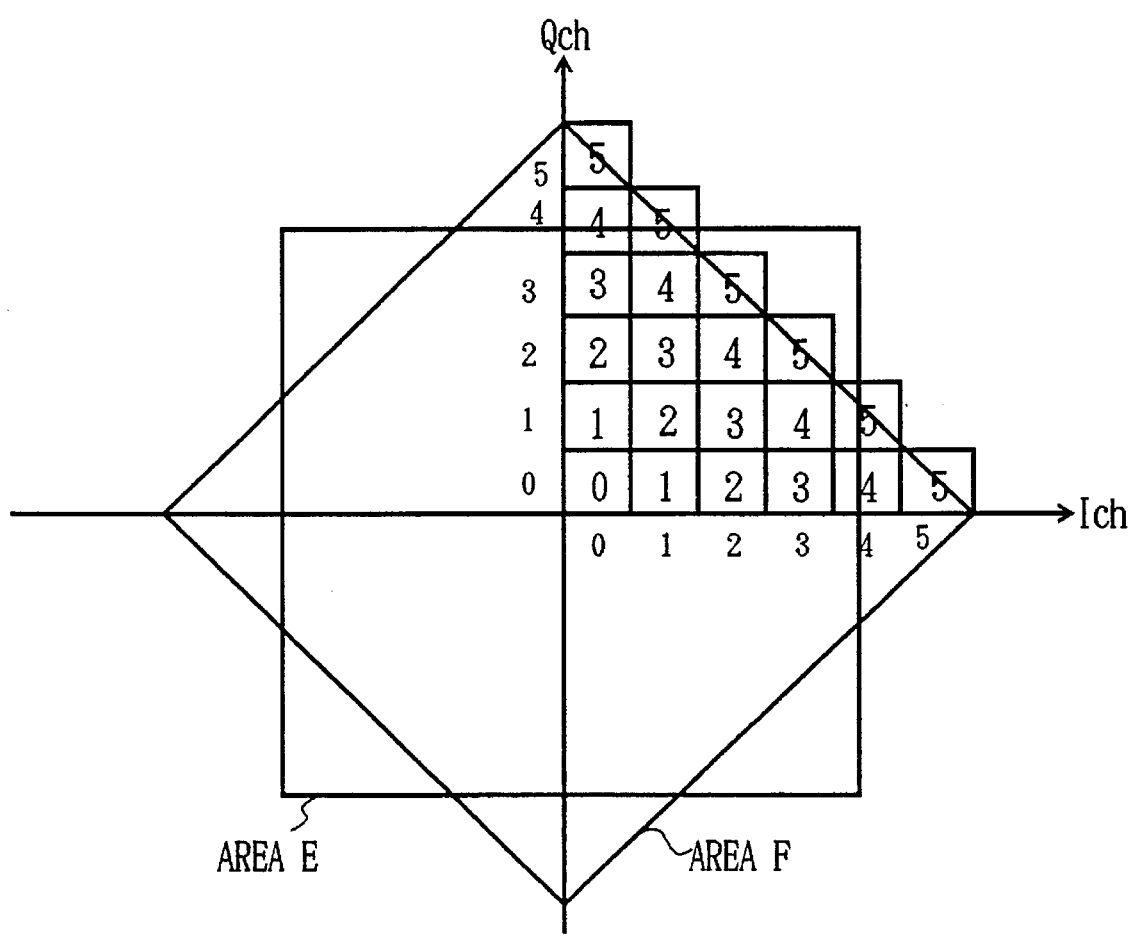
FIG. 16 is an enlarged diagram of areas E and F shown in FIG. 15.

The meaning of comparison with the inputs A and B in the adder 135 will be explained referring to FIG. 16. FIG. 16 is an enlarged diagram of the areas E and F shown in FIG. 15. In FIG. 15, the area E is a square area within the range from the origin to the minimum amplitude. The amplitudes of areas are expressed by the signals of $Y_{Q7}$ and $Y_{Q8}$ in the Qch direction, and the signals of $Y_{I7}$ and $Y_{I8}$ in the Ich direction.

The area F is obtained by rotating the area E around the origin at 45 degrees. It is apparent from FIG. 16 that the value obtained by adding the Qch absolute-value signals $Y_{Q7}'$ and $Y_{Q8}'$ with the Ich signals $Y_{I7}'$ and $Y_{I8}'$ is less than 6 in the part of the area F (In FIG. 16, only the first quadrant is illustrated for simplicity).

Accordingly, the comparator 136 compares the input A with the input B and outputs the A2 when B (=6) is larger than A to show that the signal point exists in either the area E or the area F.

Further, in FIG. 12, reference numeral 137 is a NAND gate. The absolute-value signals $Y_{Q1}'$ to $Y_{Q6}'$ on the Qch side and the absolute-value signals $Y_{I1}'$ to $Y_{I6}'$ on the Ich side are inputted to the NAND gate 137. Therefore, the signal A3 of "1" is outputted from the NAND gate 137, when all inputs of absolute-value signals are "0", i.e., the signal point exists in the square area E, which is the minimum amplified area or the area F which is obtained by rotating the area E at 45 degrees.

Consequently, when the output can be outputted from the OR gate 138, the signal point exist in either of the areas A to E. The output of the OR gate 138 is outputted via the OR gate 139 as an M1 signal. Further, the synchronous/asynchronous mode switching control signal CS is outputted from the OR gate 139, even in the case of the alarm mode (CR ALM), such as a carrier signal disconnection.

Returning to FIG. 10, the M1 signal outputted from the area judging section 101 is inputted to the mode switching section 102. The synchronous/asynchronous mode switching control signal CS is inputted to the mode switching section 102. Therefore, when the control signal CS shows the asynchronous mode, the mode switching section 102 passes the M1 signal from the area judging section 101, as it is, whereas the mode switching section 102 blocks the M1 signal.

Consequently, as described above, the control according to the present invention is performed.

Figure 17:
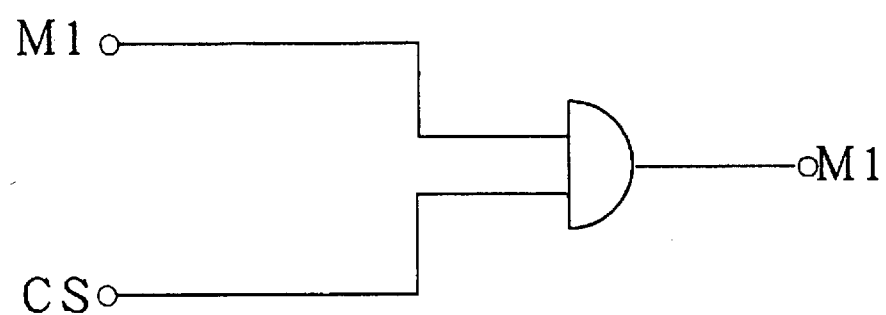
FIG. 17 is a schematic circuit diagram showing a structural example of a mode switching section shown in FIG. 10.

FIG. 17 is a schematic circuit diagram of the mode switching section 102. The mode switching section 102 is composed of the AND gate having two input terminals. The M1 signal outputted from the area judging section 101 is inputted to one input terminal, and the synchronous/asynchronous mode switching control signal CS is inputted to another input terminal. The control signal CS has a level of "1" at the asynchronous mode. Accordingly, the M1 signal is outputted at the asynchronous mode.

The equalized output outputted from the adaptive transversal filter 7 is also inputted to the error signal generator 103. The error signal generator 103 detects the distance from the signal point of the receipt IF signal and outputs the size of the distance e as an error signal.

Figure 18:
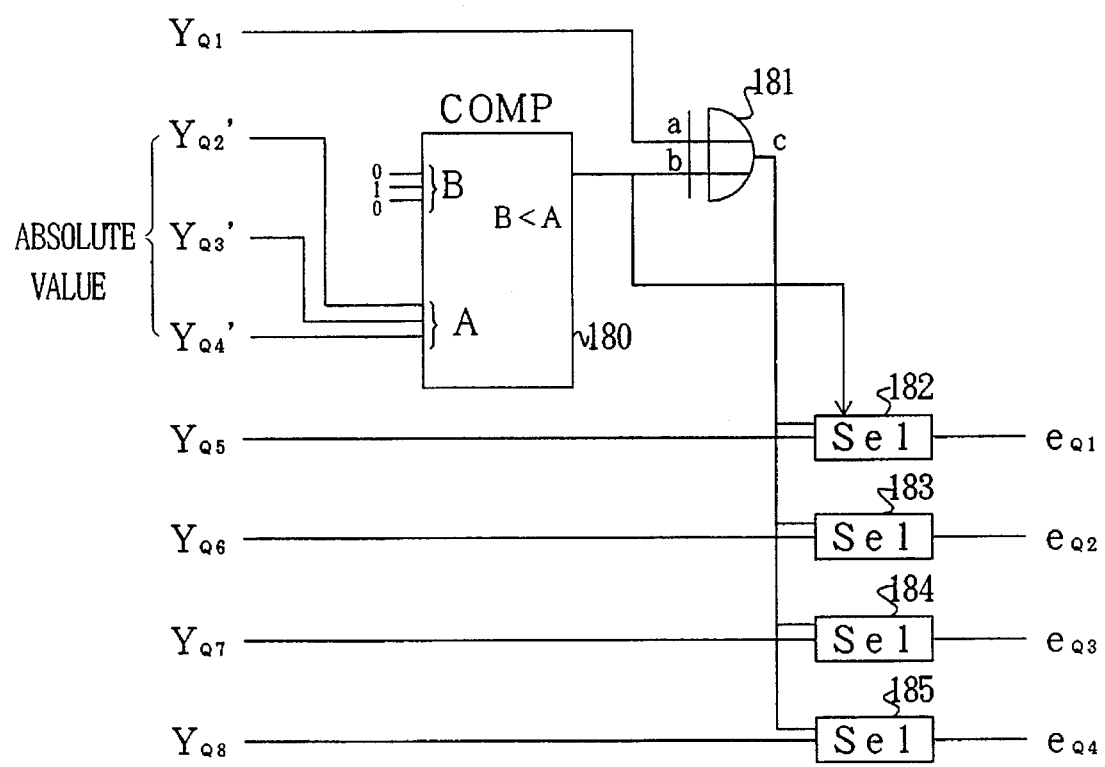
FIG. 18 is a schematic circuit diagram showing a structural example of an error signal generator shown in FIG. 10.

FIG. 18 is a schematic circuit diagram of the error signal generator 103. FIG. 18 shows only the error signal generator on the Qch side. However, the error signal generator on the Ich circuit has the same structure of the Qch circuit shown in FIG. 18. The error signal generator 103 includes a comparator 180, an EXOR circuit 181, and selectors 182 to 185.

The absolute-values $Y_{Q2}'$, $Y_{Q3}'$ and $Y_{Q4}'$ of the second to fourth bits of the equalized signal YQ are inputted to the input A of the comparator 180, and the value of "010" is inputted to the input B. Referring to FIG. 15, when the receipt signal enters within a range larger than (0, 1, 0) in positive area, or a range smaller than (1, 0, 1) in negative area as to $(Y_{Q1}, Y_{Q2}, Y_{Q3})$ for the Qch direction, the value "1" is outputted from the comparator 180 as an output b.

A polarity bit $Y_{Q1}$ which is a first bit of the equalized output and the output b of the comparator 180 are inputted to the input terminals a and b, respectively. When the output b outputted from the comparator 180 is "1" and the polarity bit $Y_{Q1}$ is 0, and the output b is "0" and the polarity bit $Y_{Q1}$ is "1", the EXOR circuit 181 outputs "1".

Meanwhile, the lower 4 bits, $Y_{Q5}$ to $Y_{Q8}$ of the equalized signal are inputted as an error signal to each of one input terminals of the selectors 182 to 185, respectively, and the output c of the EXOR circuit 181 is inputted to each of another input terminals of selectors 182 to 185. Further, the output b of the comparator 180 controls the switching of each of the selectors 182 to 185. When the output b is "1", the output c of the EXOR circuit 181 is selected and outputted. When the output b is "0", the error signals $Y_{Q5}$ to $Y_{Q8}$ are selected and outputted.

Accordingly, the relation between the output b of the comparator 180 and the outputs of the selectors 182 to 185 becomes as follows;

| "The output b of the comparator 180" | "$Y_{Q1}$" | "The output of the selectors 182 to 185" |
|---|---|---|
| "1" | "1" | $e_{Q1}$ to $e_{Q4}$ = all "0" |
|  | "0" | $e_{Q1}$ to $e_{Q4}$ = all "1" |
| "0" | "1" | $e_{Q1}$ to $e_{Q4}$ = $Y_{Q5}$ to $Y_{Q8}$ |
|  | "0" | $e_{Q1}$ to $e_{Q4}$ = $Y_{Q5}$ to $Y_{Q8}$ |

Then the outputs $e_{Q1}$ to $e_{Q4}$ of the selectors 182 to 185 are outputted as the error signals. It is apparent from the above-explanation that the error signals are outputted as the error signals $e_{Q1}$ to $e_{Q4}$ limited to the fixed size of "1, 1, 1, 1" or "0, 0, 0, 0" in the areas out of the signal point areas.

Figure 19:
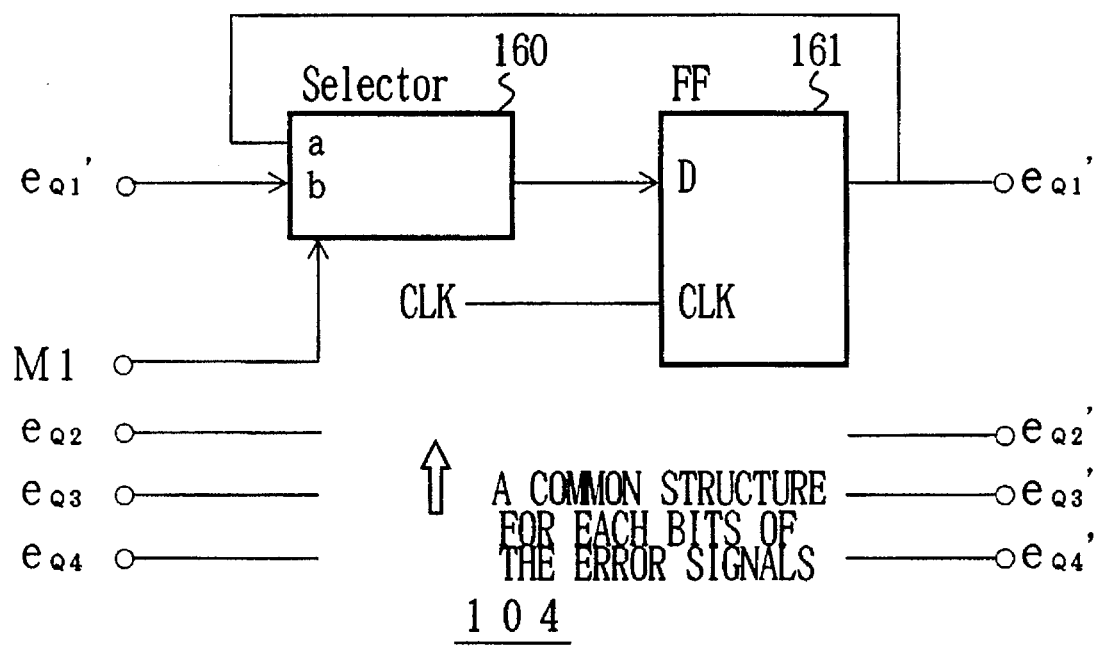
FIG. 19 is a schematic circuit diagram showing a structural example of an error selector shown in FIG. 10.

The error signal which is an output of the error signal generator 103 is guided to the error selector 104. The error selector 104 has a common structure for each bits of the error signals $e_{Q1}$ to $e_{Q4}$ which are the outputs of the signal generator 103, as shown in the example of FIG. 19. The structure for the $e_{Q1}$ is shown in FIG. 19.

The error selector 104 includes a selector 160 and a flip-flop FF 161. The selector 160 selects the error signal $e_{Q1}$ and inputs it to the flip-flop FF 161, when the M1 signal outputted from the area judging section 101 is "1", i.e., the signal point exists in either the areas A to E or the area F. When the M1 signal is "0", i.e., the signal point does not exist in either the areas A to E or the area F, the selector 160 selects and outputs a previous error signal before being fed back from the flip-flop FF 161 and outputs the signal.

With the control of the error selector 104, compensation control is performed based on the signal point of the areas A to E and the area F at the asynchronous mode, so that it becomes possible to prevent from the influence of phase rotation.

Returning to FIG. 10, the output of the error selector 104 is led to the logic circuit 105. The logic circuit 105 can be improved by the structural example shown in FIG. 20.

Figure 20:
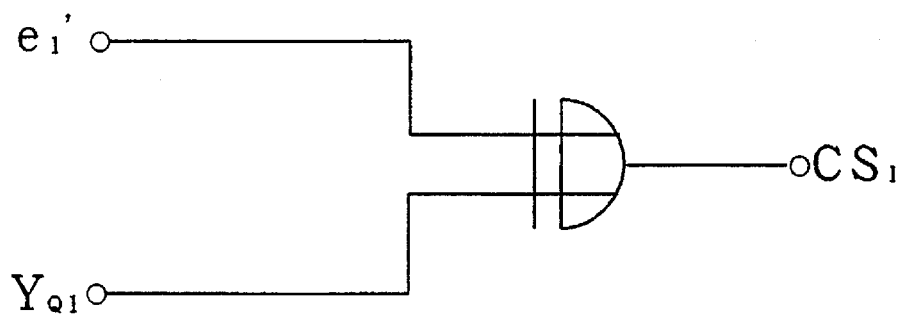
FIG. 20 is a schematic circuit diagram showing a structural example of a logical circuit shown in FIG. 10.

In FIG. 20, the logic circuit 105 has an EXOR circuit. The absolute-value $e_I'$ of the first bit $e_I$ of the Ich error signal selected and outputted by the error selector 104 is inputted to one input terminal of the EXOR circuit of the error selector 104. The first bit of the equalized output from the adaptive transversal filter 7, i.e., the polarity bit $Y_{Q1}$, is transmitted via a delay circuit 106 to another input terminal of the EXOR circuit of the logic circuit 105 to reverse the direction of the control signal of the amplifying section 4. In FIG. 20, only the Qch circuit is shown, however the Ich circuit has the same structure of the Qch circuit.

Further, in FIG. 10, the output signal of the error selector 104 is employed as an error signal for the interference compensating section 70 for adaptively compensating other groups of signal interference according to interference characteristic. Further, the operation in the interference compensating section 70 is same as that of the interference compensating circuit 70 as described in FIG. 9.

Figure 21:
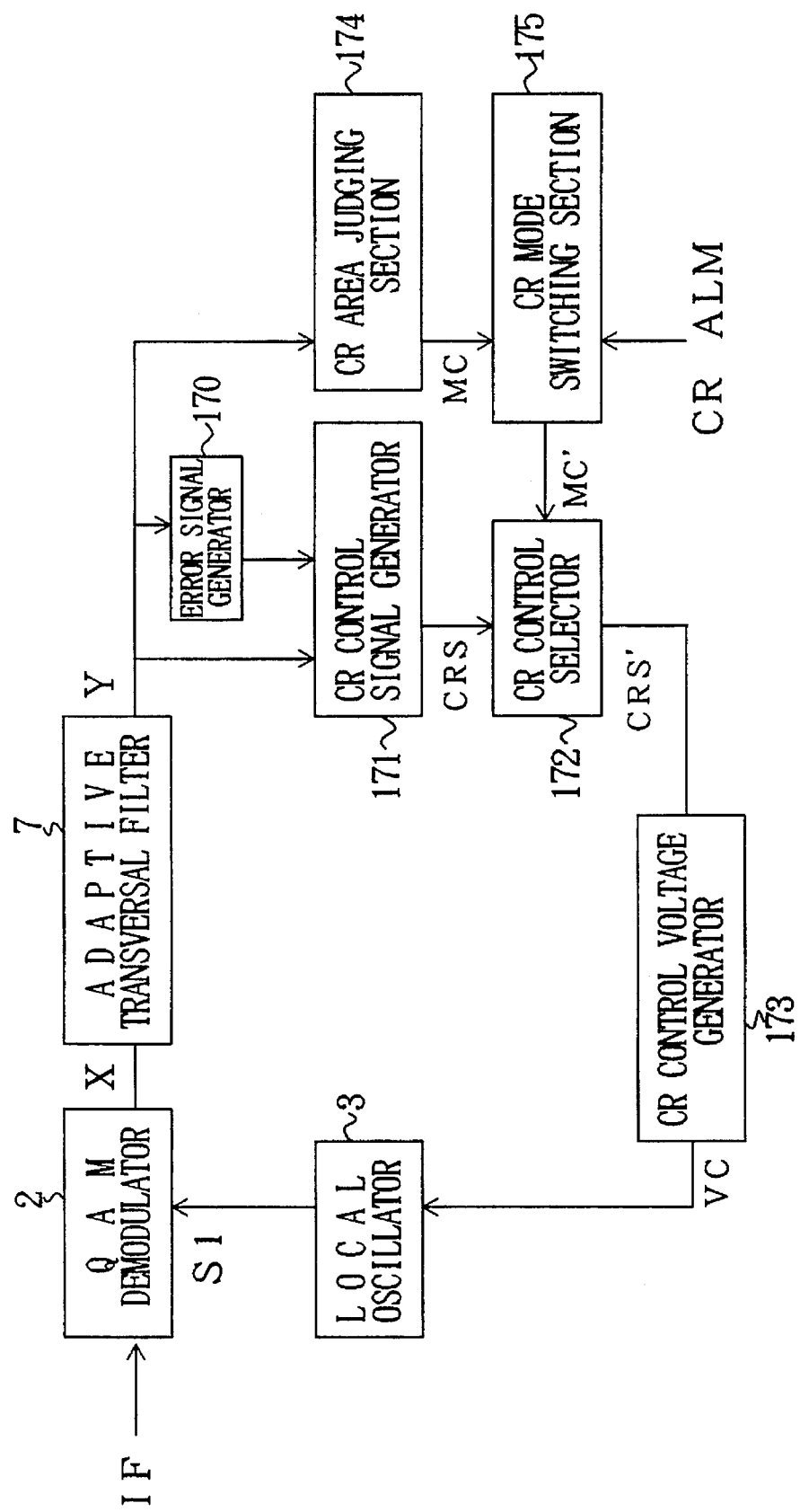
FIG. 21 is a block diagram of one embodiment for controlling a carrier phase according to the present invention.

FIG. 21 is a block diagram of an embodiment for controlling phase of a carrier signal S1 from the local oscillator 3 shown in FIG. 10. In FIG. 21, the diagram except the part of phase control of the carrier signal S1 is briefly shown for simplicity.

In FIG. 21, the block diagram further illustrates a structure of a CR control signal generator 171, a CR control selector 172, a CR control voltage generator 173, a CR area judging section 174 and a CR mode switching section 175. The error signal generator 170 having the error signal generator 103 and the error selector 104 is shown in FIG. 10, which means the limited error signal is inputted to the CR control signal generator 171.

Figure 22:
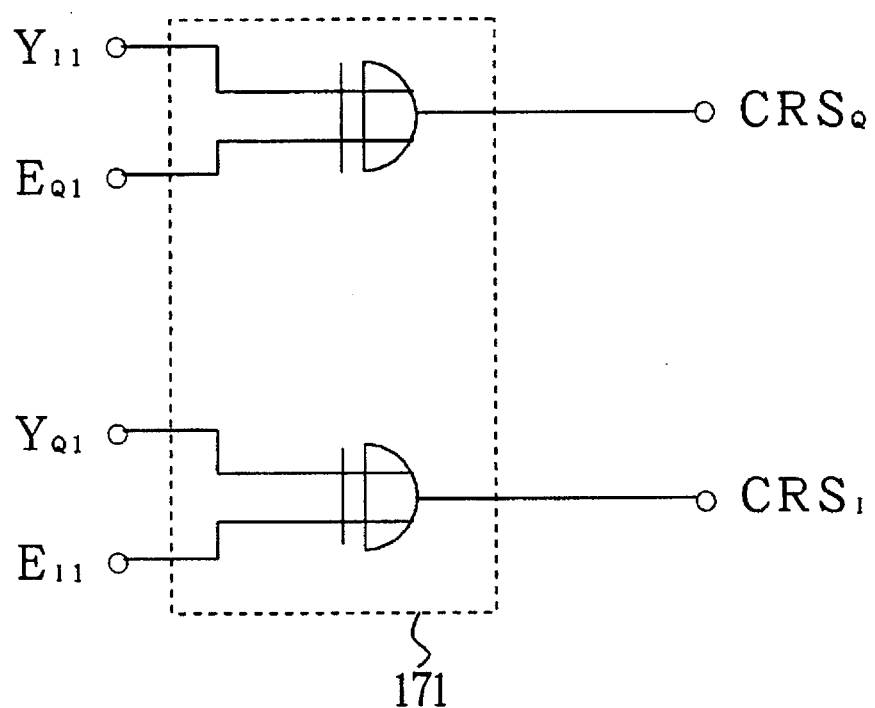
FIG. 22 is a schematic circuit diagram showing a structural example of a CR control signal generator shown in FIG. 21.

As described in FIG. 22, the CR control signal generator 171 is composed of a pair of EXOR circuits corresponding to the Qch and Ich circuits, respectively. The Qch error signal $E_{Q1}$ and the first bit of the Ich equalized signal, i.e., the polarity bit $Y_{I1}$, and the Ich error signal $E_{I1}$ and the first bit $E_{I1}$ of the Qch equalized signal, i.e., the polarity bit $Y_{Q1}$, are inputted to each of the pair of EXOR circuits.

Then, the Qch CR control signal $CRS_Q$ and the Ich CR control signal $CRS_I$ are outputted from each of the EXOR circuits.

The relation between the CR control signal $CRS_Q$ and $CRS_I$ on phase plane will be explained referring to FIG. 23. In the diagram, the+marks show a constellation of the fixed signal points, and one part of the signal point area and outside area of the signal point area are shown as an enlarged diagram. In FIG. 24, the upper side of coordinates expressed with "1" and "0" shows the CR control signal $CRS_Q$, and the lower side of coordinates shows the CR control signal $CRS_I$.

The coordinates of the CR control signals $CRS_Q$ and $CRS_I$ in each of the areas of ① to ⑥ positioned in the areas out of the signal point areas are (1, 0), (1, 1), (0, 1), (1, 0), (0, 0), and (0, 1). Further, the logic is reversed in the areas ①' to ⑥' positioned in the areas symmetrical to the areas ① to ⑥ folded with the Qch axis as a reference. Therefore, the coordinates are (0, 1), (0, 0), (1, 0), (0, 1), (1, 1) and (1, 0).

Figure 23A:
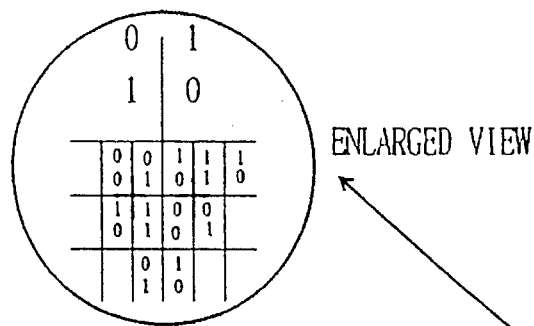
FIG. 23 is an explanatory diagram of the relation between CR control signals CRSQ and CRSI.
Figure 23B:
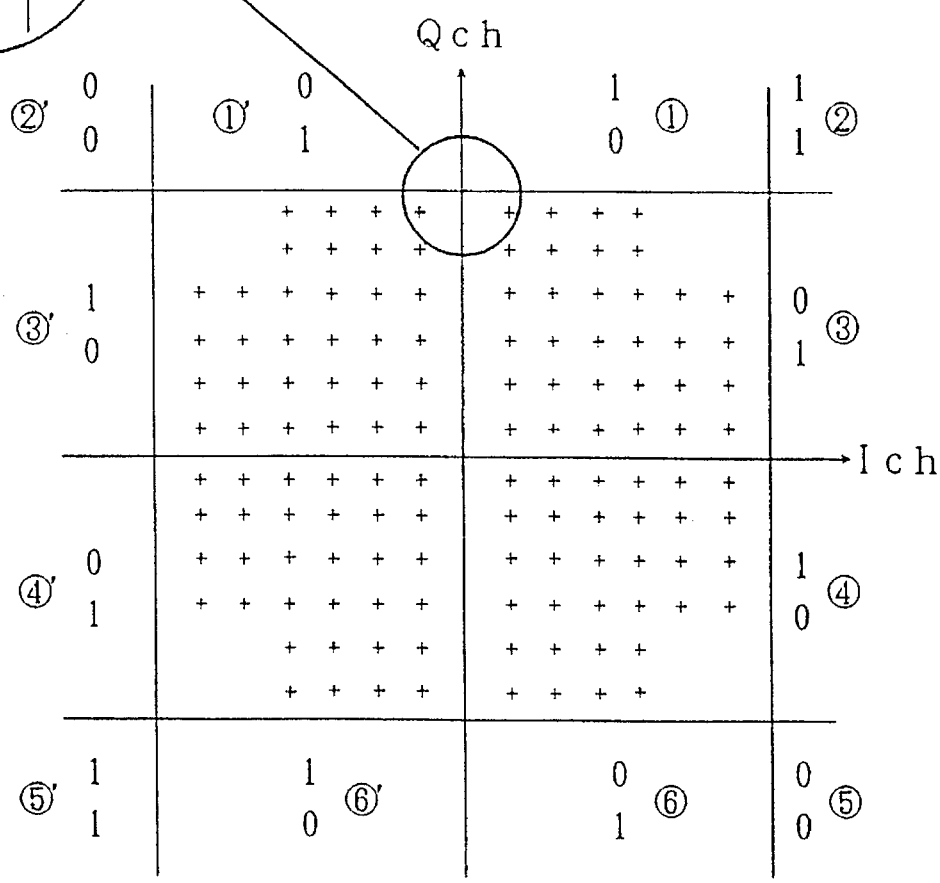
Figure 24:
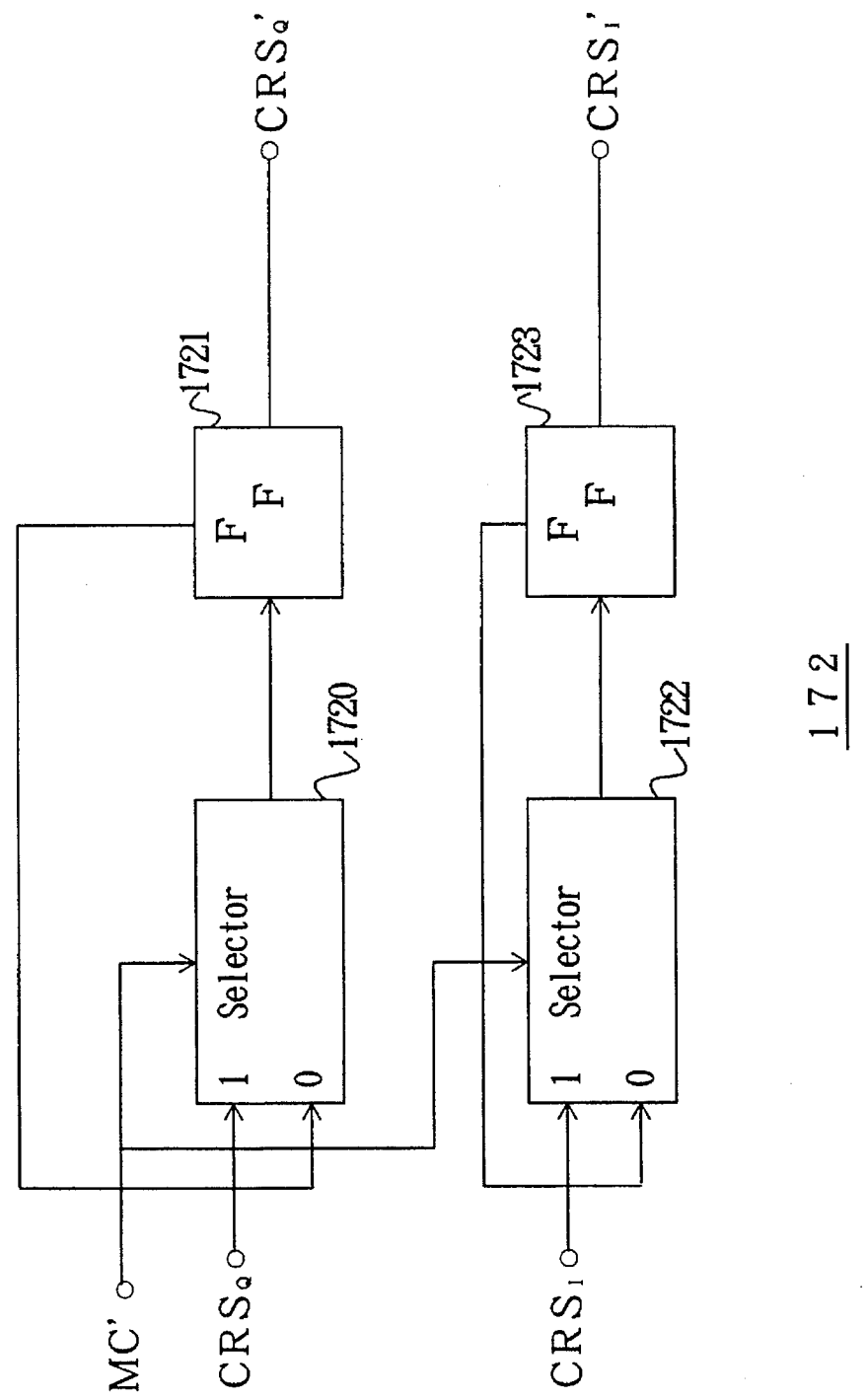
FIG. 24 is an explanatory diagram of a structure of a CR control selector shown in FIG. 21.

Similarly, the coordinates of the CR control signals $CRS_Q$ and $CRS_I$ of the first to fourth quadrants employing each signal point in the signal point area as the origin are (1, 1) in the first quadrant, (1, 0) in the second quadrant, (0, 0) in the third quadrant, and (0, 1) in the fourth quadrant, with reference to a part of an enlarged part shown in FIG. 23. Therefore, the coordinates of the CR control signals $CRS_Q$ and $CRS_I$ of the first to fourth quadrants employing the signal points as a reference positioned in the areas symmetrical to each of areas folded with the Qch axis are (0, 1) in the first quadrant, (0, 0) in the second quadrant, (1, 0) in the third quadrant, and (1, 1) in the fourth quadrant.

Accordingly, the phase of the local carrier signal S1 outputted from the local oscillator 3 is controlled so as that a fixed logic of the coordinates of the CR control signals $CRS_Q$ and $CRS_I$ in each area and each signal point correspond to the logic of the corresponding areas in the received IF signal.

More particularly, the CR control signals $CRS_Q$ and $CRS_I$ outputted from the CR control signal generator 171 are inputted to the CR control selector 172. The structure of the CR control selector 172 is shown in FIG. 24. The CR control selector 172 includes selectors 1720 and 1722, and flip-flops FF 1721 and 1723.

In the case where the receipt signal is in the synchronous mode, and the signal point of the receipt signal exists in the signal point area, the selectors 1720 and 1722 select the inputted CR control signals $CRS_Q$ and $CRS_I$ and output the signals via the flip-flops FF 1721 and 1723.

Meanwhile, in the case where the CR area judging section 174, explained later, detects that the receipt signal exists in an area out of the signal point area, and the signal is not synchronized, the CR control signals $CRS_Q$ and $CRS_I$ which are fed back from the flip-flops FF 1721 and 1722 by the switching signal MC' outputted from the mode switching section 175.

The CR control signal CRS' selected and outputted in the CR control selector 172 is led to the CR control voltage generator 173. The CR control voltage generator 173 outputs analog signals VC which have three levels of +, − and 0 according to the coordinates of logic described before the CR control signals $CRS_Q$ and $CRS_I$ in the CR control signal CRS'.

The local oscillator 3 is controlled so as that the analog signal VC having+level rotates the phase of local carrier S1 toward the clockwise direction, and the analog signal VC having−level rotates the phase of local carrier S1 toward the counterclockwise direction.

Figure 25:
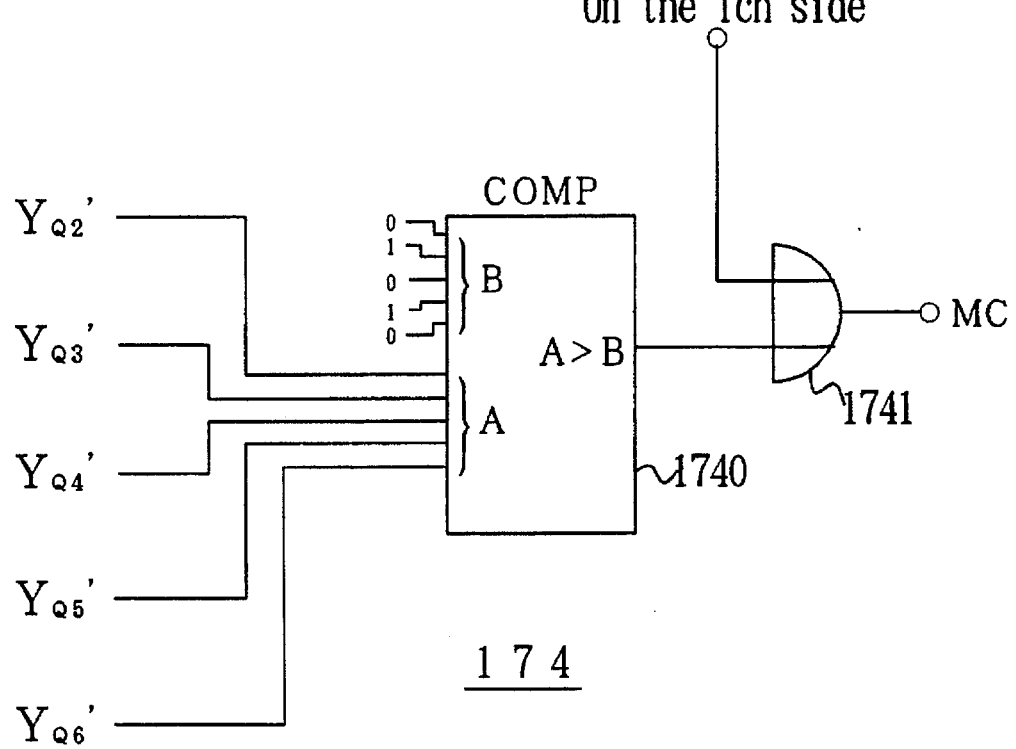
FIG. 25 is a schematic circuit diagram for explaining a structure of a CR area judging section shown in FIG. 21.

The operation will be explained referring to FIG. 25 which shows the structure of the CR area judging section 174 shown in FIG. 21. FIG. 25 illustrates a structure of the Qch CR area judging section 174. The CR area judging section 174 includes a comparator 1740 and an OR circuit 1741. The Ich circuit has the same structure of the Qch circuit. The signals $Y_{Q2}'$ to $Y_{Q6}'$ converted the second to sixth bits of the equalized signal Y outputted from the adaptive transversal filter 7 to the absolute-values are inputted to the inputs A of the comparator 1740.

Figure 26:
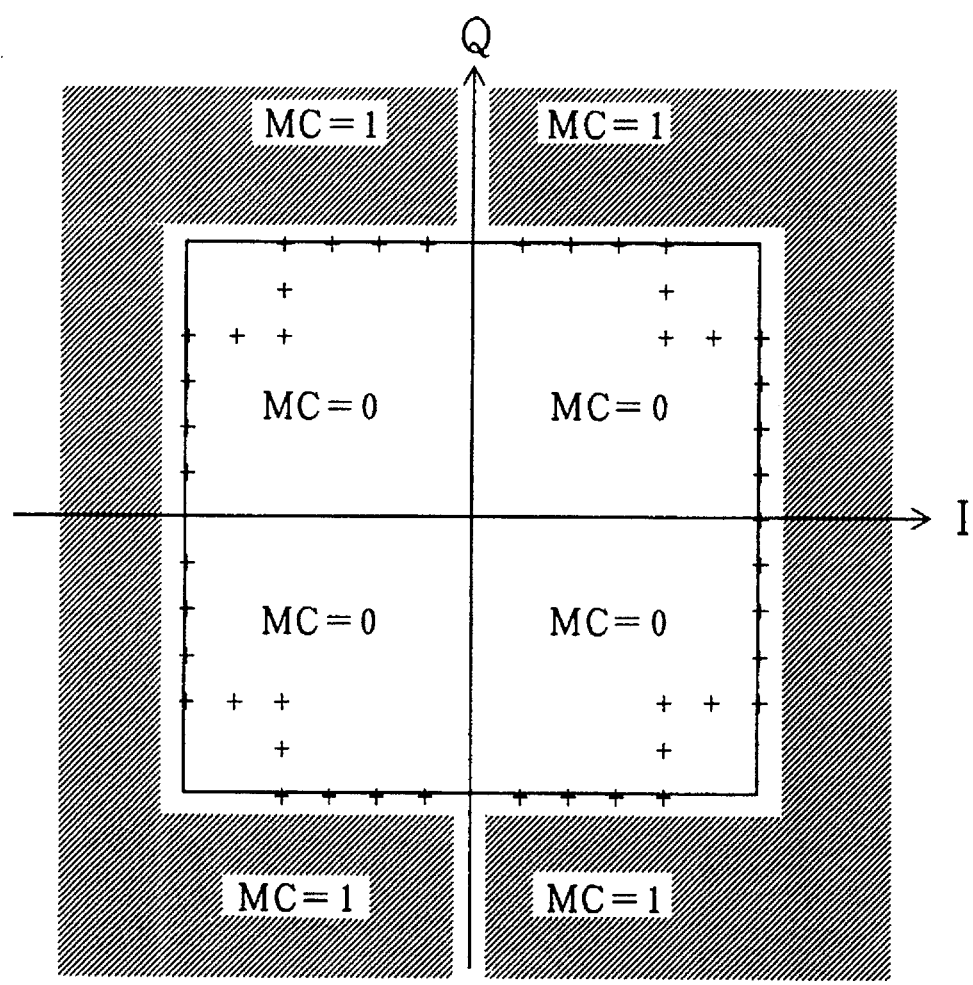
FIG. 26 is an explanatory diagram of a relation between signal point areas and a mode switching signal MC.

Meanwhile, the signals of "0 1 0 1 0" are inputted to the input B of the comparator 1740. Accordingly, the output of MC=1 is generated from the comparator 1740, when the signals $Y_{Q2}'$ to $Y_{Q6}'$ exceed the signals of "0 1 0 1 0". The meaning will be explained referring to FIG. 26. FIG. 26 shows the area in the signal point and the area out of the signal point with oblique lines. That is, MC=0 in the area in the signal point, and MC=1 in the area out of the signal point.

That is, it is easily understood referring to FIG. 15 that the signal point of the receipt signal exists in the area out of the signal point areas, when the Qch absolute-value signals $Y_{Q2}'$ to $Y_{Q6}'$ and the Ich absolute-value signals $Y_{I2}'$ to $Y_{I6}'$ exceed the signal of "0 1 0 1 0".

Consequently, in FIG. 25, the comparator 1740 judges the input A is larger than the input B and outputs MC=1 showing that the signal point of the receipt signal exists in the area out of the signal point areas. Similarly, the MC=1 is outputted in the Ich CR area judging section, when the signal point of the receipt signal exceeds the signal point area. Therefore, the MC=1 is outputted from either the Qch OR circuit 1741 or the Ich OR circuit 1741.

Figure 27:
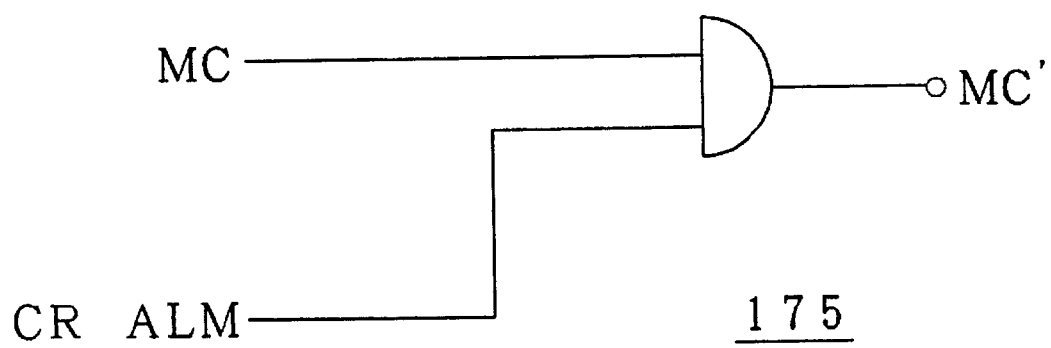
FIG. 27 is a schematic circuit diagram for explaining a structure of a CR mode switching section shown in FIG. 21.

FIG. 27 shows a structure of the CR mode switching section 175. The CR mode switching section 175 is composed of an AND circuit. Accordingly, the mode switching signal MC' is outputted when the output of MC=1 outputted from the CR area judging section 174 and the CR alarm signal (CR-ALM) showing the asynchronous mode appear. The mode switching signal MC' controls the switching so as to control the selectors 1720 and 1721 to output the contents previously set in the flip-flops FF 1721 and 1723, as explained in FIG. 24.

As explained according to the embodiment, the digital multiplexing radio receiver controls the gain of amplifier, equalized characteristic and phase of local carrier by employing only the data obtained from the signal points in the specified area in which the influence caused by the phase variation is small, when the receipt signal is out of phase.

Accordingly, in comparison with the conventional radio receiver which always controls based on all signal points, the radio receiver according to the present invention can extend a carrier capture range and rapidly return to the synchronous mode. In the case of controlling the all signal points in the prior art, the capture range becomes plus and minus 15 in normal mode, and plus and minus 50 in a pulling mode. In the case where the radio receiver according to the present invention is employed, the capture range becomes plus and minus 90.

Figure 28:
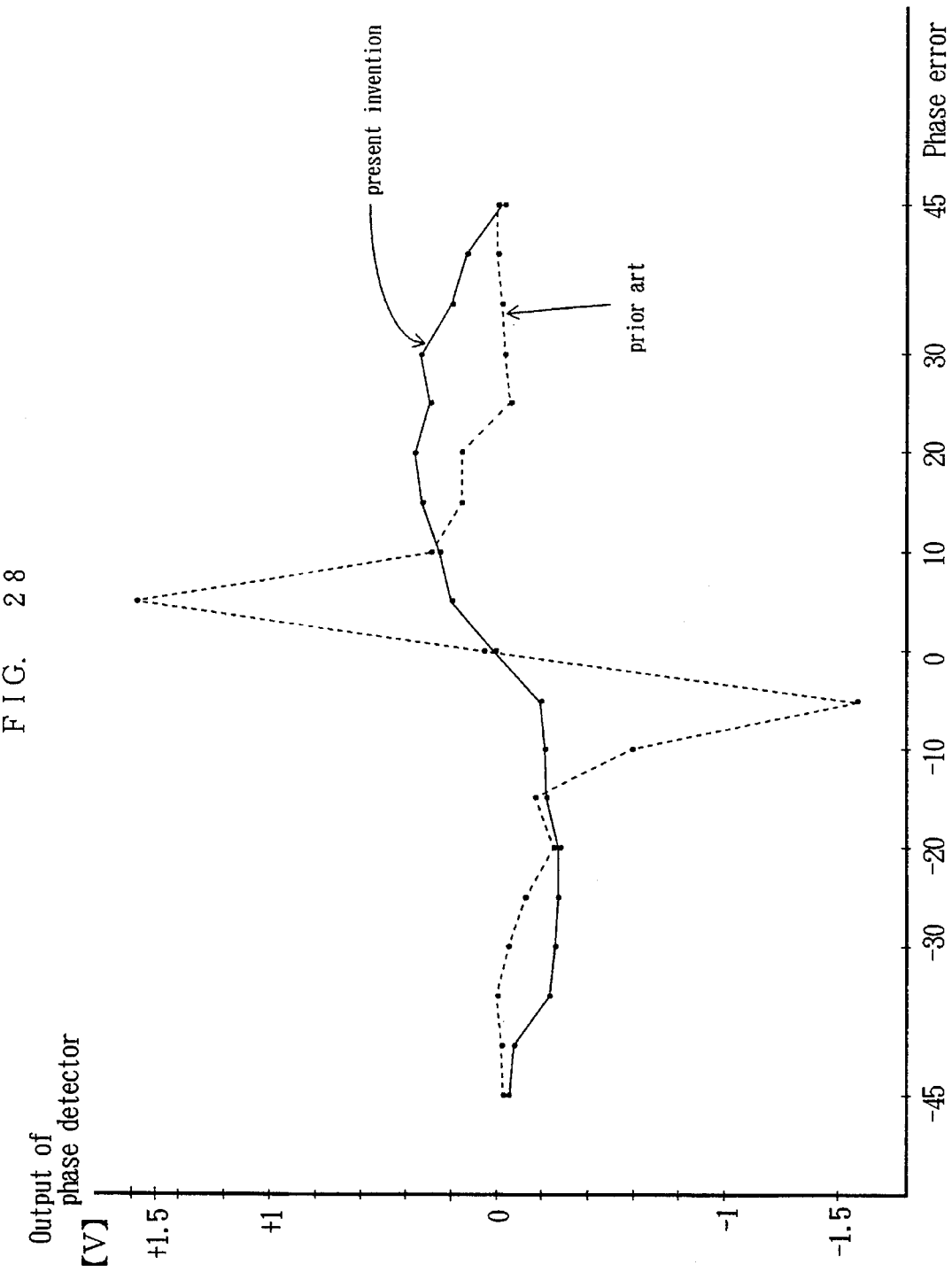
FIG. 28 is a graph showing comparison data of the present invention and the prior art as to phase errors and outputs of a phase error detector.

Further, FIG. 28 indicates a graph, which is measured and obtained the inventors, showing between a phase error of a receipt signal and an output of phase error detector in comparison the case of employing the present invention with the case of the conventional method for controlling all signal points.

It is easily understood from the graph that the range for detecting phase error is extended in the case of employing the present invention, shown with a soiled line in the diagram, in comparison with the case of employing the prior art. As is also apparent form the graph, the present invention ensures a controlling of compensation of phase error to speed up the time for returning to the synchronous mode.

The present embodiment is to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A digital multiplexing radio receiver comprising:

first means for generating a carrier frequency signal;

second means for demodulating a received multi-level orthogonal amplitude signal with the carrier frequency signal output from the first means and outputting Ich and Qch demodulated orthogonal signals;

third means operatively connected to the second means for amplifying the Ich and Qch demodulated orthogonal signals and outputting Ich and Qch amplified signals;

fourth means operatively connected to the third means for adaptively equalizing the Ich and Qch amplified signals and outputting Ich and Qch adaptively-equalized data;

fifth means operatively connected to the first means and the fourth means for supplying a first control signal to the first means to make the frequency of the carrier frequency signal the same as that of the received multi-level orthogonal amplitude signal; and sixth means operatively connected to the third means and the fourth means for generating and outputting a second control signal to the third means to amplify the Ich and Qch demodulated signals to a predetermined level, the second control signal being generated based on the Ich and Qch adaptively-equalized data output from the fourth means, of the multi-level orthogonal amplitude signal existing in a signal point area on a phase plane of Ich and Qch orthogonal coordinates in the case where the Ich and Qch demodulated orthogonal signal is synchronized with the carrier frequency signal, and of the multi-level orthogonal amplitude signal existing in a first specified area other than the signal point area on a phase plane of Ich and Qch orthogonal coordinates in the case where the Ich and Qch demodulated orthogonal signal is not synchronized with the carrier frequency signal.

2. The digital multiplexing radio receiver according to claim 1;

wherein there is further comprised of a means operatively connected to the fourth and sixth means for generating a third control signal in either of the case where the multi-level orthogonal amplitude signal is not synchronized with the carrier frequency signal and the Ich and Qch adaptively-equalized data is in the first specified area, or the case where the multi-level orthogonal amplitude signal is synchronized with the carrier frequency signal, and supplying the third control signal to the sixth means, and the sixth means sends the second control signal to the third means when the third control signal is supplied, and sends the previously outputted second control signal to the third means when third control signal is not supplied.

3. The digital multiplexing radio receiver according to claim 1;

wherein the first specified area includes a first area formed by connecting the minimum amplitude signal points of multi-level orthogonal amplitude signal on the phase plane of the Ich and Qch orthogonal coordinates, and a second area having four areas which are between extension lines extending each of four sides of a square formed by connecting the maximum amplitude signal points of multi-level orthogonal amplitude signal on the phase plane of the Ich and Qch orthogonal coordinates and including each of the extension lines in the direction of the maximum amplitude signals.

4. The digital multiplexing radio receiver according to claim 2, further comprising;

a means connected between the third and fourth means for giving an offset to the Ich and Qch amplified signals;

a means operatively connected to the offset means and the fourth means for generating and outputting an offset control signal to control the offset means to give the offset to the Ich and Qch amplified signals, based on the Ich and Qch adaptively-equalized data existing in a second specified area on the phase plane of Ich and Qch orthogonal coordinates in the case where the multi-level orthogonal amplitude signal is not synchronized with the carrier frequency signal; and a means operatively connected to the fourth means and the offset control signal generating means for controlling the offset control signal generating means to generate and supply the offset control signal in either of the case where the multi-level orthogonal amplitude signal is not synchronized with the carrier frequency signal and the Ich and Qch adaptively-equalized data exist in the second specified area, or the case where the multi-level orthogonal amplitude signal is synchronized with the carrier frequency signal.

5. The digital multiplexing radio receiver according to claim 4, wherein the second specified area includes an area outside of a square formed by connecting the maximum amplitude signal points of multi-level orthogonal amplitude signal on the phase plane of the Ich and Qch orthogonal coordinates.

6. The digital multiplexing radio receiver according to claim 4, wherein the fourth means has a first and second control circuits for the Ich and Qch sides, respectively, and each of the first and second control circuits includes;

a tap coefficient updating means for obtaining a tap coefficient to make a first error signal to minimum, based on the first error signal and a coarse signal, which is converted to have a predetermined coarse level from the amplified signal, a first FIR filter for forming the adaptively-equalized data by a convolution arithmetic of the amplified signal and the tap coefficient, an error detecting means for forming a second error signal by comparing the adaptive-equalized data with a predetermined signal, and an error generating means for generating the first error signal from the second error signal when the multi-level orthogonal amplitude signal is not synchronized with the carrier frequency signal and the adaptively-equalized data is in the first specified area.

7. The digital multiplexing radio receiver according to claim 6, wherein each of the first and second control circuits includes an adder means for adding the adaptively-equalized data output from the first FIR filter and an interference compensating signal supplied from a different polarization side and outputting a compensated adaptively-equalized data, and interference compensating circuits, which are provided respectively for the Ich and Qch sides for outputting the interference compensating signal, each of the interference compensating circuits having a second tap coefficient updating section for obtaining a tap coefficient to make the first error signal to minimum, based on a coarse signal of a fixed level converted from the amplified signal and the first error signal, and a second FIR filter for forming the interference compensating signal by convolution arithmetic of the amplified signal on a different polarization side with the tap coefficient.

8. The digital multiplexing radio receiver according to claim 1, wherein the case where the Ich and Qch demodulated orthogonal signal is not synchronized with the carrier frequency signal is detected by an out-phase detection signal, which indicates an out-phase in frames of the received multi-level orthogonal amplitude signal.

9. A digital multiplexing radio receiver comprising:

a means for generating a local carrier frequency signal;

a means for demodulating a received multi-level orthogonal amplitude signal to Qch and Ich demodulated orthogonal signals with the local carrier frequency signal;

a means operatively connected to the demodulating means for amplifying the Qch and Ich demodulated orthogonal signals and outputting Qch and Ich amplified signals;

an adaptive transversal filter means operatively connected to the amplifying means for adaptively equalizing the Qch and Ich amplified signals and outputting Qch and Ich adaptively-equalized data;

a means for obtaining an error signal of a signal point of the multi-level orthogonal amplitude signal;

a means for obtaining an EXOR between a polarity bit of an adaptively-equalized data outputted from the adaptive transversal filter means and a first bit of the error signal; and a means for determining a direction of phase control of the local carrier signal according to the relation between the obtained EXOR and a fixed EXOR corresponding to each signal point.

10. The digital multiplexing radio receiver according to claim 9, wherein the means for obtaining the EXOR has a pair of EXOR circuits, to which a polarity bit of Qch adaptively-equalized data, and a first bit of Ich error signal, and a polarity bit of Ich adaptively-equalized data and a first bit of Qch error signal are inputted respectively, coordinates expressed by a pair of fixed 2 bits is corresponded to each signal point in advance, and a control signal is outputted from the means for determining a direction of a phase control of the local carrier signal so that a pair of fixed 2 bits corresponds to the output of the pair of EXOR circuits.

11. The digital multiplexing radio receiver according to claim 10, wherein the means for determining a direction of phase control of the local carrier signal generates+and−levels of analog signals rotating the phase of local carrier signal from right to left, according to a difference between the pair of fixed 2 bits and the output of the pair of EXOR circuits.

12. The digital multiplexing radio receiver according to claim 9, wherein there are further comprised of an area judging means which is connected to the adaptive transversal filter means for judging whether or not a receipt IF signal exists in a signal point area and outputting a mode control signal as a result of judgment, a means for outputting a switching and selecting signal, in the case where the mode control signal shows that the signal point of the received IF signal exists in the area out of signal point areas, and an alarm signal at carrier disconnection is inputted, and the means for obtaining the EXOR based on a signal point of a previous received IF signal, in the case where a switching and selecting signal outputted from the means for outputting the switching and selecting signal is inputted.

* * * * *